(12) United States Patent
Hobin et al.

(10) Patent No.: US 11,776,205 B2
(45) Date of Patent: Oct. 3, 2023

(54) DETERMINATION OF INTERACTIONS WITH PREDEFINED VOLUMES OF SPACE BASED ON AUTOMATED ANALYSIS OF VOLUMETRIC VIDEO

(71) Applicant: PTC INC., Boston, MA (US)

(72) Inventors: James Keat Hobin, Cambridge, MA (US); Valentin Heun, Cambridge, MA (US)

( * ) Notice: Subject to any disclaimer, the term of this patent is extended or adjusted under 35 U.S.C. 154(b) by 0 days.

(21) Appl. No.: 17/343,707

(22) Filed: Jun. 9, 2021

(65) Prior Publication Data

US 2021/0383604 A1 Dec. 9, 2021

Related U.S. Application Data

(60) Provisional application No. 63/036,984, filed on Jun. 9, 2020.

(51) Int. Cl.
*G06T 17/00* (2006.01)
*G06T 19/00* (2011.01)
*G06T 7/73* (2017.01)

(52) U.S. Cl.
CPC ........... *G06T 17/00* (2013.01); *G06T 7/73* (2017.01); *G06T 19/003* (2013.01);
(Continued)

(58) Field of Classification Search
CPC ........... G06T 17/00; G06T 17/20; G06T 7/73; G06T 19/003; G06T 2207/10028;
(Continued)

(56) References Cited

U.S. PATENT DOCUMENTS 9,740,187 B2 * 8/2017 Lobb ..................... G06F 3/011
2013/0321575 A1 * 12/2013 Kirk ..................... H04N 13/243
348/E13.064

(Continued)

OTHER PUBLICATIONS

You, Suya, and Ulrich Neumann. "V-Sentinel: a novel framework for situational awareness and surveillance." Sensors, and Command, Control, Communications, and Intelligence (C3I) Technologies for Homeland Security and Homeland Defense IV. vol. 5778. SPIE, 2005. (Year: 2005).*
Akenine-Moller, Thomas and Eric Haines. "Real-Time Rendering." 2nd ed. (2002), pp. 61-64. (Year: 2002).*
Chi, Seokho, and Carlos Caldas. "Image-based safety assessment: Automated spatial safety risk identification of earthmoving and surface mining activities." Journal of Construction Engineering and Management-ASCE 183.3 (2012): 341-351. (Year: 2012).*

(Continued)

*Primary Examiner* — Daniel F Hajnik
(74) *Attorney, Agent, or Firm* — Patent GC LLC; Alexander Franco

(57) ABSTRACT

One or more image and/or depth cameras capture images and/or depths of a physical environment over time. A computer system processes the images to create a static 3-dimensional (3D) model representing stationary structure and a dynamic 3D model representing moving or moveable objects within the environment. The system visually overlays the dynamic 3D model over the static 3D model in a user interface. Through the user interface, a user can create virtual spatial interaction sensors, each of which is defined by a volume of space within the environment. A virtual spatial interaction sensor can be triggered, based on analysis of the dynamic 3D model by the computer system, whenever a moveable object within the environment intersects the defined volume of the sensor. Times and durations of intersections can be logged and used for process refinement.

20 Claims, 28 Drawing Sheets
(25 of 28 Drawing Sheet(s) Filed in Color)

(52) U.S. Cl.
CPC ............... *G06T 2207/10028* (2013.01); *G06T 2207/30164* (2013.01); *G06T 2207/30232* (2013.01); *G06T 2210/21* (2013.01)

(58) Field of Classification Search
CPC . G06T 2207/30164; G06T 2207/30232; G06T 2210/21
See application file for complete search history.

(56) References Cited

U.S. PATENT DOCUMENTS

| | | | |
|---|---|---|---|
| 2014/0267273 A1* | 9/2014 | Kontkanen | G06T 17/05 345/426 |
| 2016/0300181 A1* | 10/2016 | Iwai | G06Q 30/02 |
| 2017/0309034 A1* | 10/2017 | Mueller | G06T 7/80 |
| 2019/0083885 A1* | 3/2019 | Yee | A63F 13/40 |
| 2020/0312042 A1* | 10/2020 | Sardari | G06T 7/70 |

OTHER PUBLICATIONS

Bortolini, Marco, et al. "Motion Analysis System (MAS) for production and ergonomics assessment in the manufacturing processes." Computers & Industrial Engineering 139 (2020): 105485. (Year: 2020).*

Lao, Weilun, Jungong Han, and Peter Hn De With. "Automatic video-based human motion analyzer for consumer surveillance system." IEEE Transactions on Consumer Electronics 55.2 (2009): 591-598. (Year: 2009).*

"Mario Kart Live: Home Circuit—Overview Trailer—Nintendo Switch", Transcript of video located at: https://www.youtube.com/watch?v=X6o6T40w6As, Oct. 1, 2020, 2 pages.

"Wyze—Detection Settings and Zones", Web page printout of URL: https://wyzelabs.zendesk.com/hc/en-us/articles/360030147091-Detection-Settings-and-Zones#Detection-Zones, Aug. 6, 2020, 3 pages.

* cited by examiner

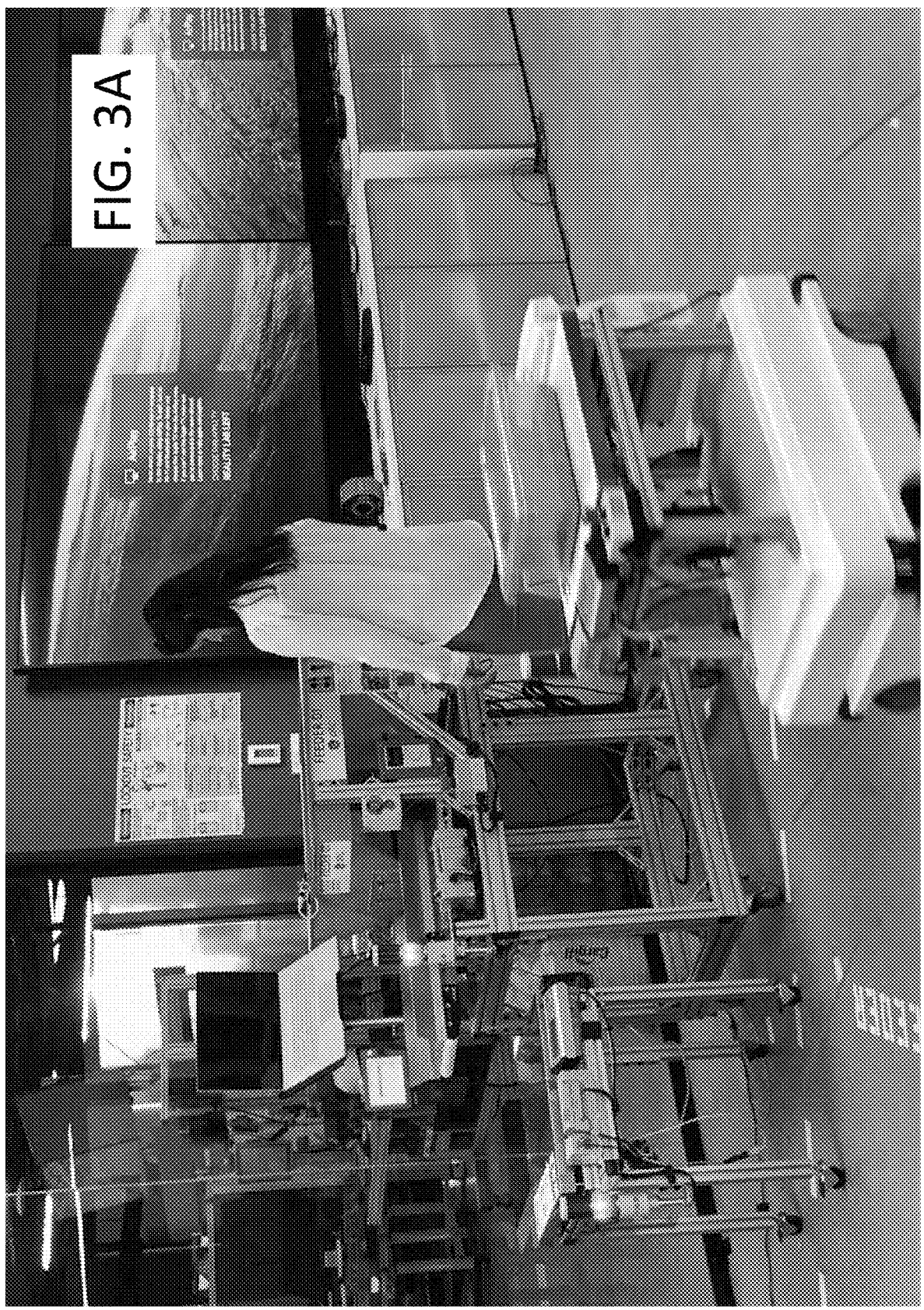

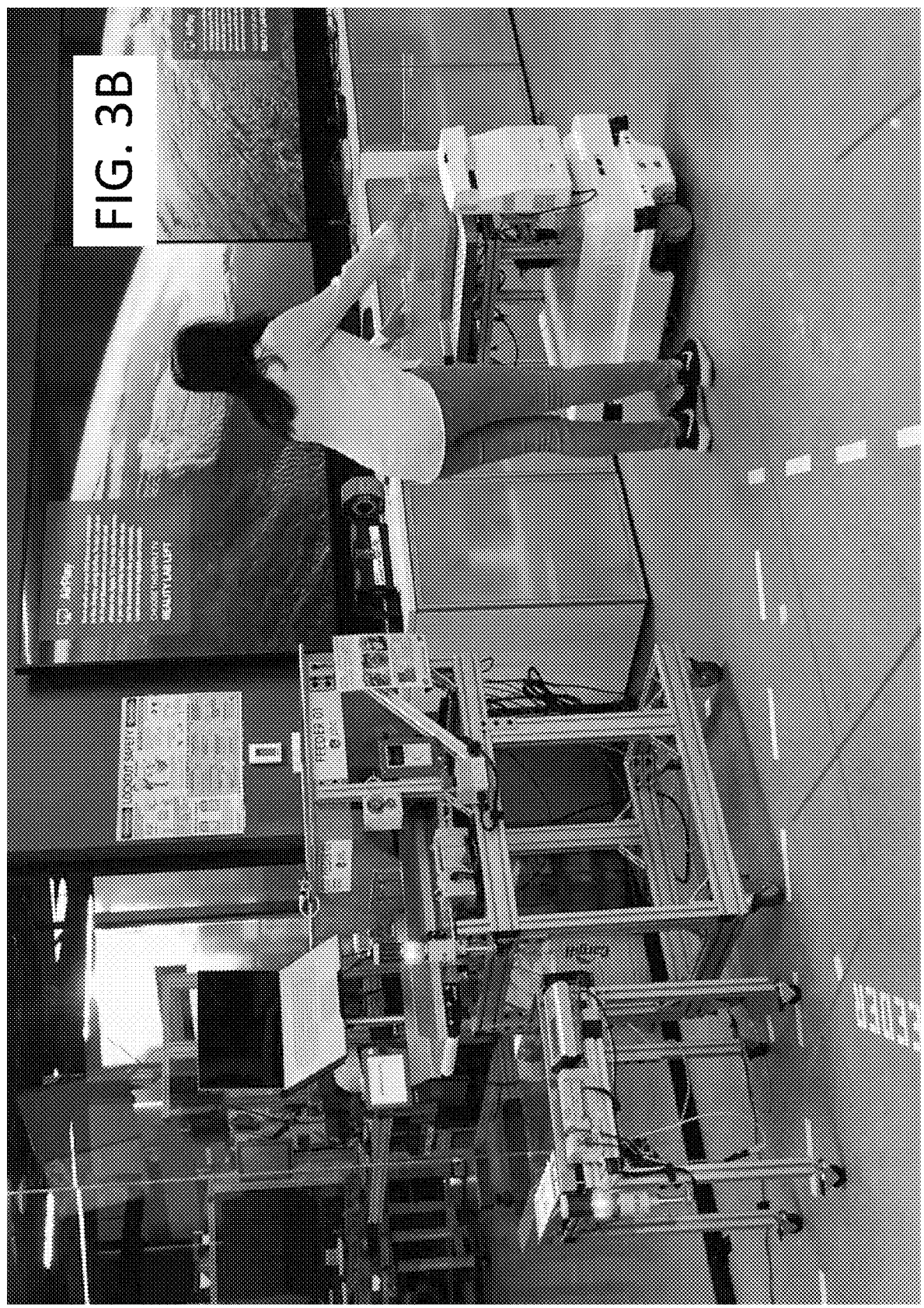

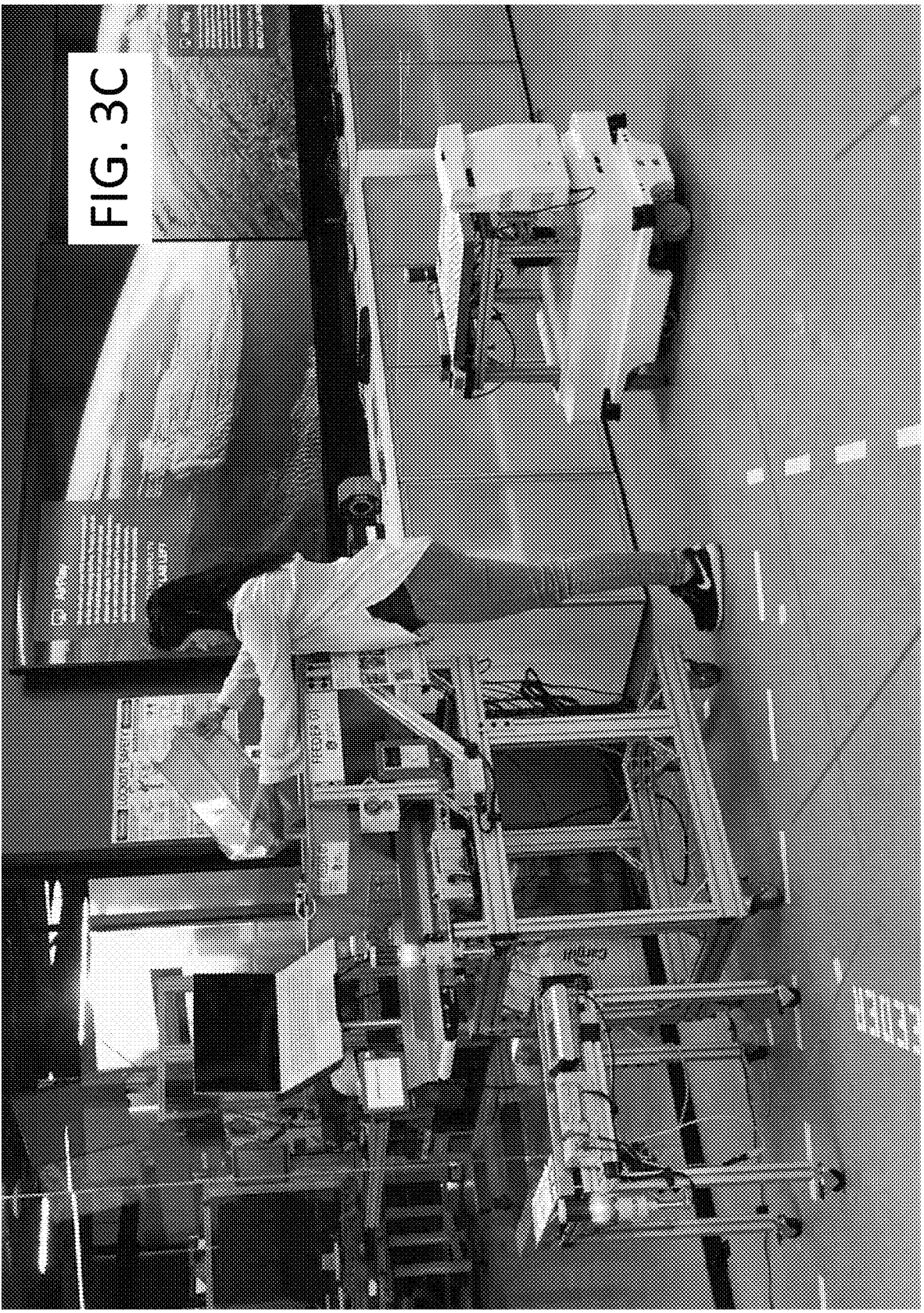

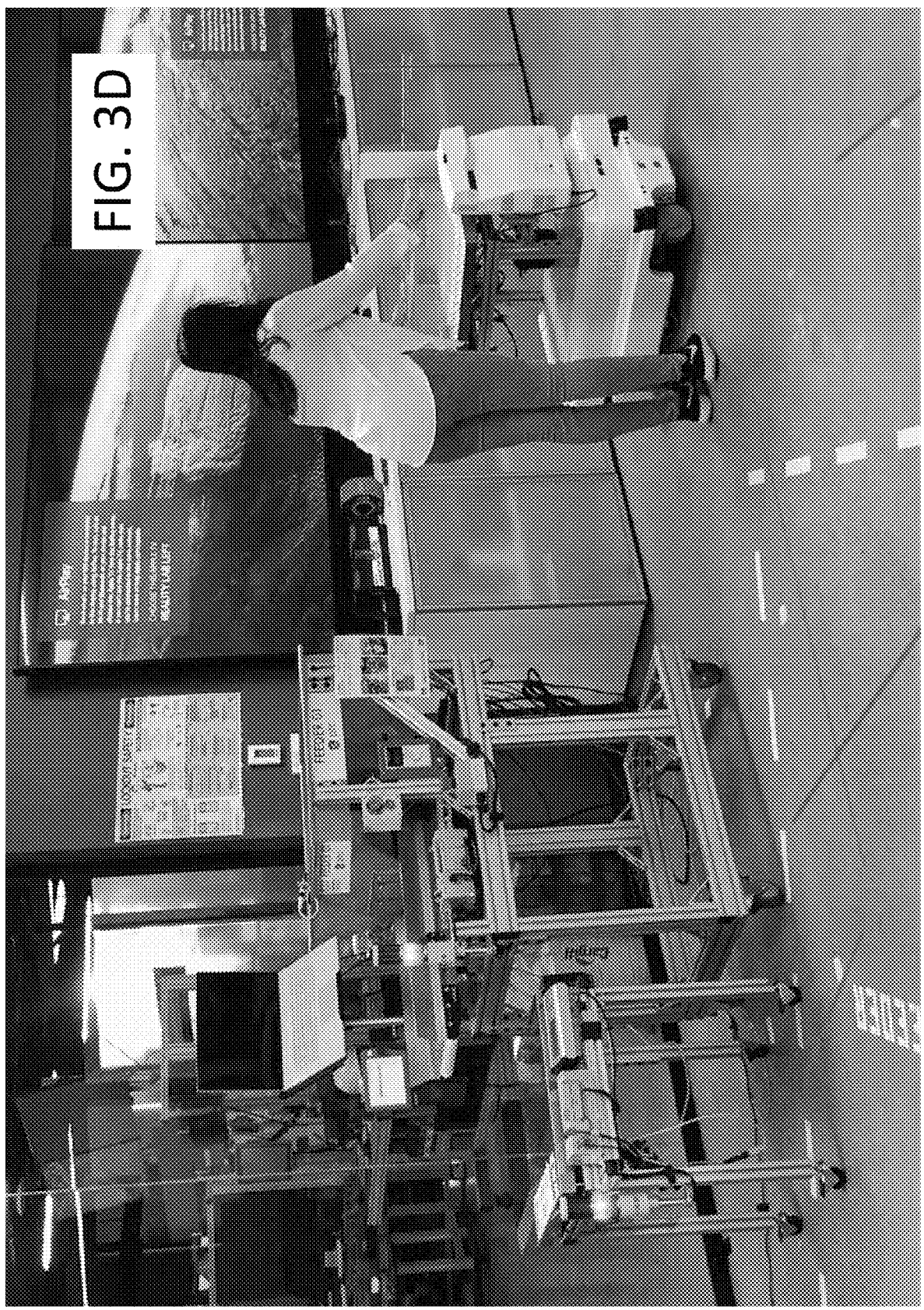

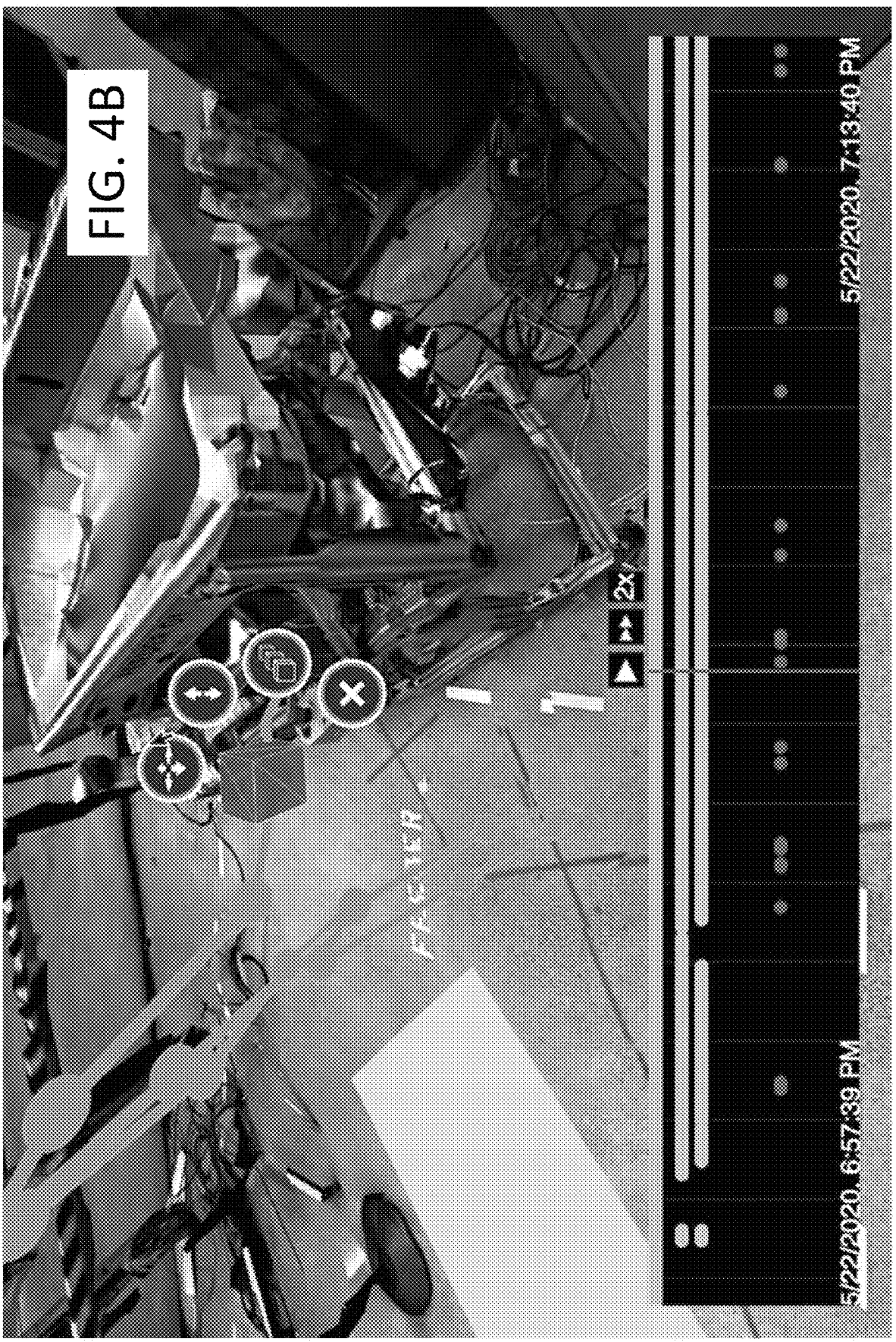

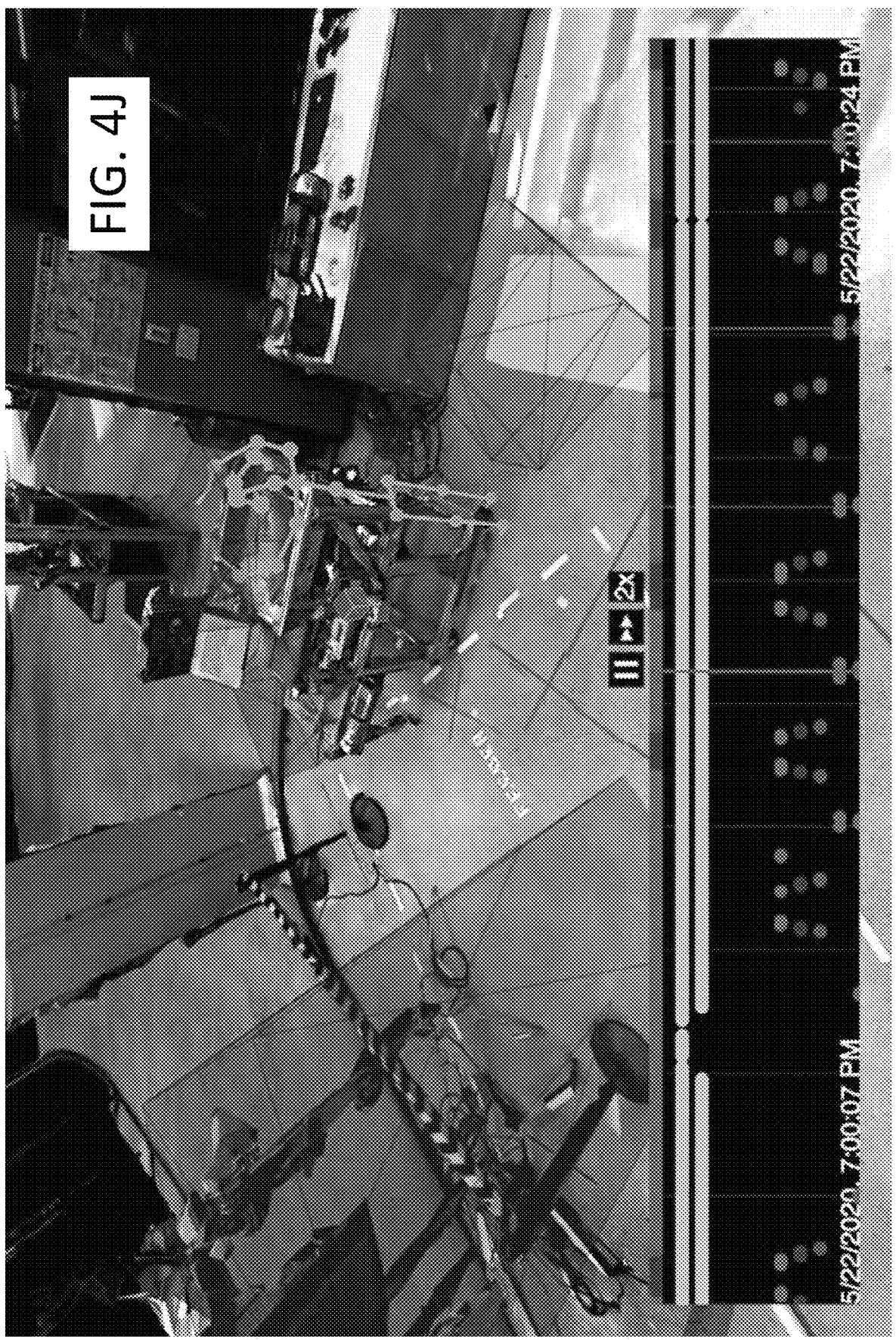

DETERMINATION OF INTERACTIONS WITH PREDEFINED VOLUMES OF SPACE BASED ON AUTOMATED ANALYSIS OF VOLUMETRIC VIDEO

RELATED APPLICATIONS

The subject matter of this application is related to U.S. Provisional Application No. 63/036,984, filed on Jun. 9, 2020, which is hereby incorporated by reference in its entirety.

SUMMARY OF THE INVENTION

One or more image and/or depth cameras capture images and/or depths of a physical environment over time. A computer system processes the images to create a static 3-dimensional (3D) model representing stationary structure and a dynamic 3D model representing moveable or moving objects within the environment. The system visually overlays the dynamic 3D model over the static 3D model in a user interface. Through the user interface, a user can create virtual spatial interaction sensors, each of which is defined by a volume of space within the environment. A virtual spatial interaction sensor can be triggered, based on analysis of the dynamic 3D model by the computer system, whenever a moveable object within the environment intersects the defined volume of the sensor. Times and durations of intersections can be logged and used for process refinement.

A method can be performed by one or more computers, each computer having at least one processor and a memory. The method can include: receiving image data comprising multiple images of a physical industrial environment captured over one or more periods of time by one or more cameras; processing the image data to create a static 3D model representing stationary structure in the environment; processing the image data to create a dynamic 3D model representing one or more moveable objects in the environment over time; providing a user interface through which a user can view and control a visual perspective of a replay of the dynamic 3D model over time visually superimposed on the static 3D model; receiving from the user through the user interface a specification of one or more virtual spatial interaction sensors, wherein each virtual spatial interaction sensor is defined by a point or volume of space within the environment; and analyzing a portion of the dynamic 3D model to identify intersections between the one or more moveable objects and the one or more virtual spatial interaction sensors over time.

The method can be performed such that the static 3D model includes a colored point cloud or a textured polygon mesh.

The method can be performed such that each moveable object is represented in the dynamic 3D model by one or more of moveable points, lines, polygons, volumes, point clouds and polygon meshes in space.

The method can be performed such that the visual perspective of the replay of the dynamic 3D model over time visually superimposed on the static 3D model comprises one or more of moveable points, lines, polygons, volumes, point clouds and polygon meshes representing the moveable objects superimposed over a point cloud or polygon mesh representation of the stationary structure.

The method can be performed such that at least one virtual spatial interaction sensor is defined by a shape and a pose.

The method can be performed such that the shape is a geometric shape, a polygon mesh or a point cloud.

The method can be performed such that the pose is specified relative to an aspect of the environment.

The method can be performed such that the aspect of the environment is a stationary coordinate system fixed relative to the environment.

The method can be performed such that the aspect of the environment is one of the one or more moveable objects.

The method can further include storing identifications of the intersections in a log file.

The method can further include visually representing the identified intersections on a time-based graph in the user interface.

The method can further include performing an analysis of the identified intersections to identify operational inefficiencies in the industrial environment.

The method can further include triggering an action in the industrial environment based on an identified intersection.

The method can be performed such that the action comprises starting a process or stopping a process.

The method can be performed such that the one or more moveable objects comprise one or more of: a human, an industrial machine, a robot, a workpiece, a tool, and a vehicle.

The method can be performed such that each of the one or more cameras is a depth camera configured to capture color data registered with depth data.

The method can be performed such that one of the one or more cameras comprises a 3D LIDAR sensor.

The method can be performed such that the one or more cameras number at least two, and wherein the user can freely navigate a six dimensional pose of the visual perspective about the static and dynamic 3D models through the user interface.

A method can be performed by one or more computers, each computer having at least one processor and a memory. The method can include: receiving image data comprising multiple images of a physical industrial environment captured over time by a plurality of statically positioned cameras; processing a first portion of the image data to create a static 3D model representing stationary structure in the environment; determining a six dimensional pose of a mobile device camera of a mobile device operated by a user within the environment based on a feed of images from the mobile device camera and based on the static 3D model; receiving, from the user and through an augmented reality user interface on the mobile device, a specification of a virtual spatial interaction sensor, wherein the virtual spatial interaction sensor is defined by a volume of space within the environment; in response to receiving the specification from the user, creating and showing the virtual spatial interaction sensor overlaying the feed of images in the augmented reality user interface; processing a second portion of the image data to create a dynamic 3D model representing one or more moving objects in the environment over time; and analyzing the dynamic 3D model to identify intersections between the one or more moving objects and the virtual spatial interaction sensor over time.

The method can be performed such that each moveable object is represented in the dynamic 3D model by one or more of moveable points, lines, polygons, volumes, point clouds and polygon meshes in space.

The method can be performed such that the volume of space by which each virtual spatial interaction sensor is defined within the environment comprises a shape and a pose.

The method can be performed such that the shape is a geometric shape, a polygon mesh or a point cloud.

The method can be performed such that the pose is specified relative to an aspect of the environment.

The method can be performed such that the aspect of the environment is a stationary coordinate system fixed relative to the environment.

The method can be performed such that the aspect of the environment is one of the one or more moveable objects.

The method can further include storing identifications of the intersections in a log file.

The method can further include visually representing the identified intersections on a time-based graph in a user interface.

The method can further include performing an analysis of the identified intersections to identify operational inefficiencies in the industrial environment.

The method can further include triggering an action in the industrial environment based on an identified intersection.

The method can be performed such that the action comprises starting a process or stopping a process.

The method can be performed such that the one or more moveable objects comprise one or more of: a human, an industrial machine, a robot, a workpiece, a tool, and a vehicle.

The method can be performed such that each of the one or more cameras is a depth camera configured to capture color data registered with depth data.

The method can be performed such that one of the one or more cameras comprises a 3D LIDAR sensor.

A system can include the one or more computers of any of the foregoing methods, wherein the one or more computers are configured to perform the method.

One or more non-transitory computer-readable media can be encoded with computer code that, when executed by the one or more computers of any of the foregoing methods cause the one or more computers to perform the method.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 3A-D illustrate frames of video showing a laboratory environment with respect to which the system is being demonstrated.

FIGS. 4A-L illustrate views of the user interface showing the dynamic 3D model including the person and the AGV superimposed over the static 3D model of the laboratory as well as the creation and use of virtual spatial interaction sensors.

DETAILED DESCRIPTION

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted. By way of example, this disclosure may set out a set or list of a number of options or possibilities for an embodiment, and in such case, this disclosure specifically contemplates all clearly feasible combinations and/or permutations of items in the set or list.

Overview

Figure 1:
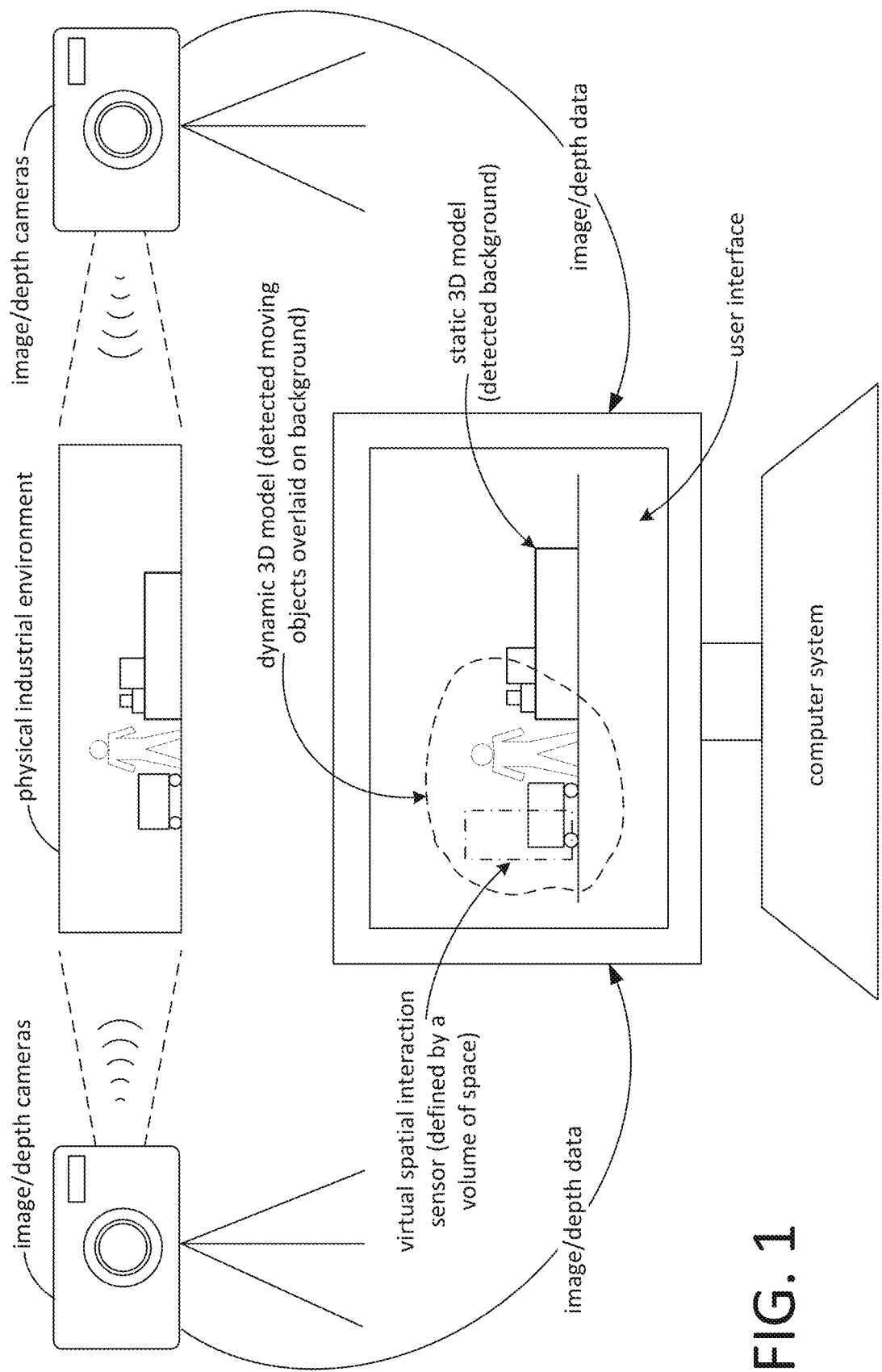
FIG. 1 illustrates a schematic overview of a system in accordance with one embodiment.

FIG. 1 illustrates a schematic overview of a system in accordance with one embodiment. The system can include one or more cameras capturing images of a physical environment, such as an industrial environment over time, where the images are transmitted to and received by a computer system for processing and analysis. The computer system processes the images to create a static 3-dimensional (3D) model representing stationary structure and a dynamic 3D model representing moveable or moving objects within the environment over time. The system visually overlays the dynamic 3D model over the static 3D model in a user interface. Through the user interface, a user can create virtual spatial interaction sensors, each of which is defined by a volume of space within the environment. A virtual spatial interaction sensor can be triggered, based on analysis of the dynamic 3D model by the computer system, whenever a moveable object within the environment intersects the defined volume of the sensor. Times and durations of intersections can be logged by the system and used for refinement or improvement of industrial processes.

The images captured by the cameras can be in the form of rapidly captured sequential images, such as 30 frame per second video, or in more coarse time-lapse form such as every few seconds, minutes, hours or days. Each of the cameras can be a visible image camera, but may also or alternatively be a depth camera configured to measure and record distances of physical surfaces from the depth camera. A combined image/depth camera can measure depths for pixels representing physical surfaces in visible images taken by the camera. The cameras can be or include 3D LIDAR functionality which can create a point cloud representation of the environment around the camera. In the case that visual image cameras without depth sensing capability are used, post-capture processing techniques can be used to infer or estimate depth and 3D structure data based on perspectives captured by one or more cameras.

The physical environment of which the images are captured can be an industrial environment, such as a manufacturing or assembly floor within a plant, and the environment can be interior to a building or exterior, such as a construction site. The physical environment can alternatively be in a non-industrial location, such as in a retail environment, commercial office space or a personal residence.

The computer system can process the images to create a static 3D model of stationary structure within the physical environment. In one embodiment, the system can analyze images captured over time to determine which pixels, objects and/or surfaces within the images remain constant. Based on which portions of the images remain constant over time, the system can create a mosaic of imagery that represents stationary structure within the environment. Alternatively, any moveable objects and people within the environment can be removed from the environment, and images taken without moveable objects can be selected by a user as representing the static environment. Based on the computed or selected static image representation, the system can create or establish a static 3D model of the environment, which can be represented, for example, as a point cloud or a polygon meshes. The point cloud can be optionally a colored point cloud and the polygon mesh can be colored or textured.

The computer system can also process the images to create a dynamic 3D model representing moving or moveable objects within the environment over time. Moving or moveable objects can be identified and located using one or more techniques. By way of example, a moveable object in the environment can be physically marked with an image target, such as an image target that can be recognized by a computer vision system in captured images to identify and locate the image target in 3D space over time. The physical characteristics of known physical objects, such as known computer aided design specifications, can also be used to identify and locate such objects within the physical environment based on the images using computer vision techniques.

In one embodiment, in order to capture human activity, the Microsoft Azure Kinect Body Tracking SDK can be used to obtain a dynamic human pose from depth-augmented video. The human pose can be represented in the dynamic 3D model as a stick figure approximation the pose of a human in the environment.

Unknown or unrecognized objects captured within the images can be optionally included or ignored depending on implementation. In one embodiment, unknown but detected objects and/or structure that are not recognized as part of the stationary structure can be added to the dynamic 3D model as dynamic structure, without specific identification.

Depending on the implementation, any one or more of the aforementioned techniques can be combined to produce a dynamic 3D model representing the physical environment over time. Depending on the implementation, the representations of the moving or movable objects in the dynamic 3D model can include one or more of moveable points, lines, polygons, volumes, point clouds and polygon meshes in space. The point clouds can be optionally colored point clouds and the polygon meshes can be colored or textured.

The computer system can visually overlay the dynamic 3D model on the static 3D model in a computer user interface, such as on a computer display, tablet or mobile device. The overlay of the dynamic 3D model over the static 3D model can provide the user a representative visual perspective of the physical environment. A video scrub bar can be displayed in the user interface to enable the user to scrub forwards and backwards to view the state of the dynamic 3D model over time. The user interface can also be configured to support control of the pose of the user's visual perspective of the models, such as with the use of a 3D mouse. The user can therefore control both the location and direction, which together represent the pose, from which the models are viewed within the user interface.

The user interface can be configured to support the creation of virtual spatial interaction sensors, where each sensor is defined by a volume of space within the environment. The user can define the volume for each sensor using the static 3D model and/or the dynamic 3D model as a backdrop for spatial and visual context. The user can use a simple 3D drawing tool to define the virtual sensor as a box, or other options can be provided for defining more complex sensor volumes. By way of example, a computer aided design tool can be used to create arbitrarily complex volumes, which can then be used to define a spatial sensor. A library of differently shaped volumes can be provided, such as boxes, spheres, and other shapes, and the end user can be given the option to pose and size the selected volume within the context of the 3D models. In one embodiment, the playback of the dynamic 3D model shown over the static 3D model can be paused while the user creates the sensors in the user interface, or the playback can be allowed to run in real time or at another selected speed, in forward and/or reverse as the user defines one or more virtual spatial interaction sensors.

A virtual spatial interaction sensor can be positioned or posed relative to some aspect of environment, such as a feature of either the static 3D or the dynamic 3D model. By way of example, an orientable sensor can be posed in a specific location and orientation in six dimensions relative to the static environment as defined by the static 3D model. Alternatively, a sensor can be posed relative to a moveable object within the environment, such as a moveable automatically guided vehicle (AGV) that is identified and tracked using an image target that has been physically affixed to the AGV in the physical environment. By way of example, a sensor can be defined to be a volume of space immediately above a platform used to carry and move product in an industrial setting on an AGV. For orientable shapes, such as a box or cuboid, the virtual spatial interaction sensor can be specified with a six dimensional pose that includes both position and orientation within the environment.

A virtual spatial interaction sensor can also or alternatively be defined by a point in space. In the case that the sensor is defined to be a point or sphere for example, it may be sufficient to specify a position rather than a pose, since no orientation is necessary.

Each spatial interaction sensor can be configured to be triggered when a moveable object represented or modeled in the dynamic 3D model intersects or collides with the defined point or volume. One or more conditions can also be defined for triggering the sensor. By way of example, a sensor can be configured to be triggered only when any or even a specific human body part intersects with the sensor. A sensor can be configured to be triggered only when a specifically identified object tracked in the dynamic 3D model intersects with the sensor, such as intersection by a recognized image target attached to an AGV with a statically positioned sensor. A sensor can be configured to be triggered upon a combination between an intersection by a specific object or any object in the 3D model in combination with any other information, such as information that might be obtained from the environment or equipment within the environment. By way of example, a sensor can be configured to be triggered only when a volume surrounding a specific button on a machine is intersected in combination with a signal from the machine that the button has been depressed or only during certain times or times of day. A sensor can be configured to indicate a time at which an intersection began and/or a duration of the intersection for each of any or all triggered intersections.

The images captured by the cameras can be modeled by the computer system in real-time as they are captured or they can be modeled at some time after capture. Similarly, the user interface can be used to view an environment in real-time or to view previously captured images of the environment. Virtual sensors can be defined and activated in real-time, or defined and applied to previously captured images over time.

Data identifying individual sensors and their triggering occurrences, such as times and durations, can be displayed in the user interface, such as with markers on a scrolling timeline or time-based graph, contemporaneously and in synchronization with a display in the user interface of the dynamic 3D model overlaid on the static 3D model. The data can also be written to a log file for offline analysis. The data can be analyzed, for example, to identify operational inefficiencies in an industrial environment.

Real-time indications of a sensor being triggered can be used, for example, to start or to stop a process. By way of example, a trigger of a virtual sensor indicating that a human hand has entered a crush zone of a hydraulic press after depression of a start button can be used to engage an emergency stop of the press. Prior technologies, such as a simple beam sensor, would not have the capability to distinguish between a workpiece positioning tool, which may be allowed and intended to enter the crush zone during operation of the press, and a human body part, which should not.

On Site Augmented Reality based Specification of Sensors

Figure 2:
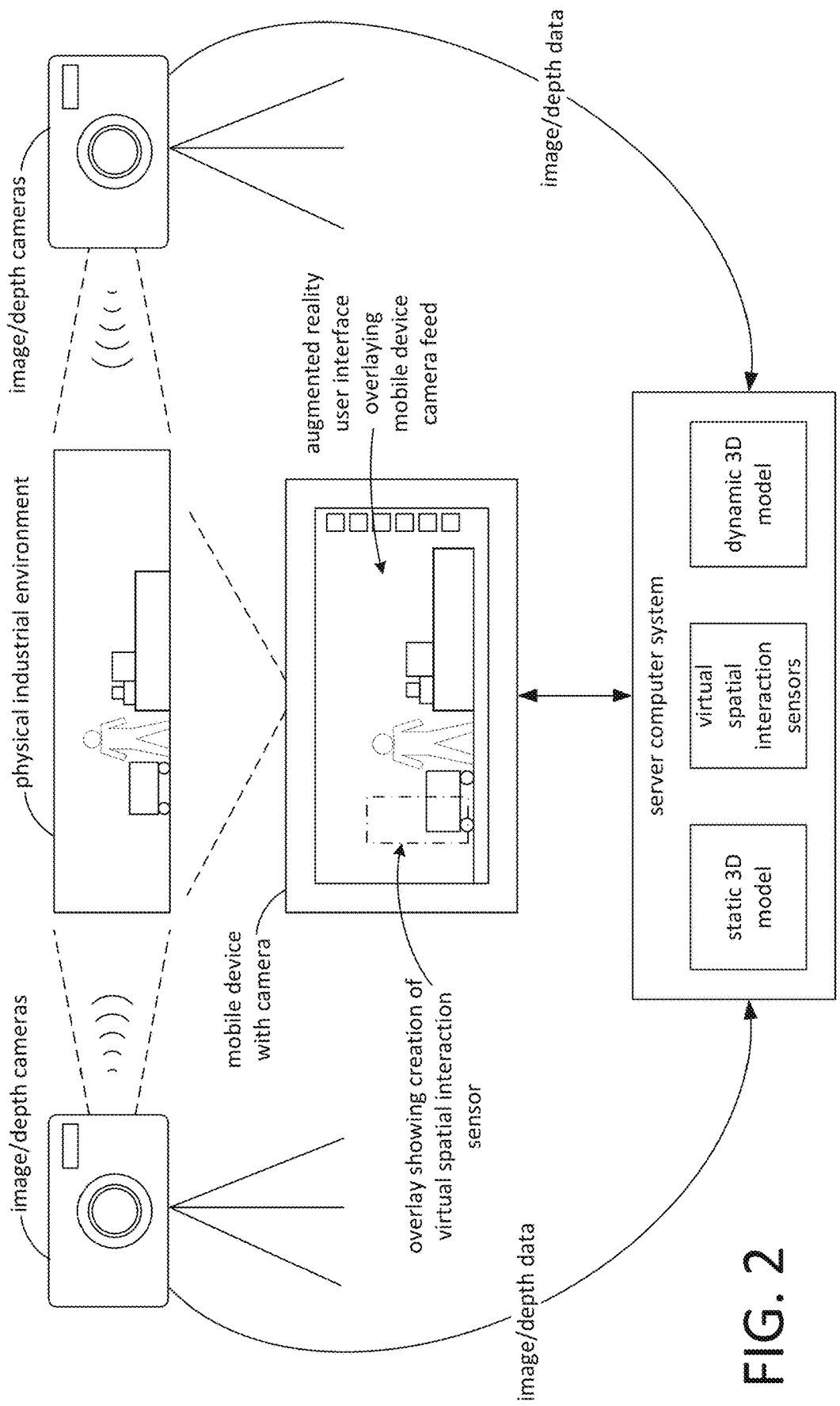
FIG. 2 illustrates a schematic overview of an embodiment showing the specification of virtual spatial interaction sensors through an augmented reality interface.

FIG. 2 illustrates a schematic overview of an embodiment showing the specification of virtual spatial interaction sensors through an augmented reality interface. The embodiment of FIG. 2 is similar to that of FIG. 1, but in the embodiment of FIG. 2, a user located on site within the industrial environment uses a mobile device with an augmented reality interface to create and specify virtual spatial interaction sensors. The mobile device can be any device with a camera and a display that supports augmented reality functionality, such as a mobile phone, a mobile tablet, or a mixed reality headset.

The mobile device can execute an application that provides an augmented reality based interface overlaying a feed of images supplied by the mobile device's camera. A user can interact with the augmented reality interface to create or specify virtual spatial interaction sensors that can then be shown in virtual space overlaying the feed of images from the device's camera.

In the embodiment of FIG. 2, a server computer system can be configured to receive image data including images of the physical industrial environment from one or more cameras, similarly to the computer system in the embodiment of FIG. 1. The cameras can be statically positioned, unlike the mobile device camera, in strategic locations within the industrial environment. The server, in turn, can process the images to create static and dynamic 3D models, similarly to the embodiment of FIG. 1.

The mobile device can be configured to communicate with the server computer system in order to perform localization within the environment (determine its 6 dimension pose within the environment). By way of example, the image feed of the mobile device camera can be compared to the static 3D model created by the server in order to determine a pose of the mobile device's camera within the environment. The computation of the pose can be performed on the mobile device based data provided by the server, on the server based on images provided by the mobile device, or in part on both the mobile device and the server.

Once the pose of the mobile device's camera has been determined, the camera pose can then be used to determine the pose of any spatial interaction sensors created by a user in the augmented reality interface overlaying the camera feed. The pose and the specification of the point or volume of the created spatial interaction sensors can then be communicated back to the server system and maintained in a database. Similarly to the embodiment of FIG. 1, the server system can process images received from the statically positioned cameras over time to continually update the dynamic 3D model and identify intersections between moving objects and the spatial interaction sensors maintained in the server's database.

System Demonstration

Figure 4A:
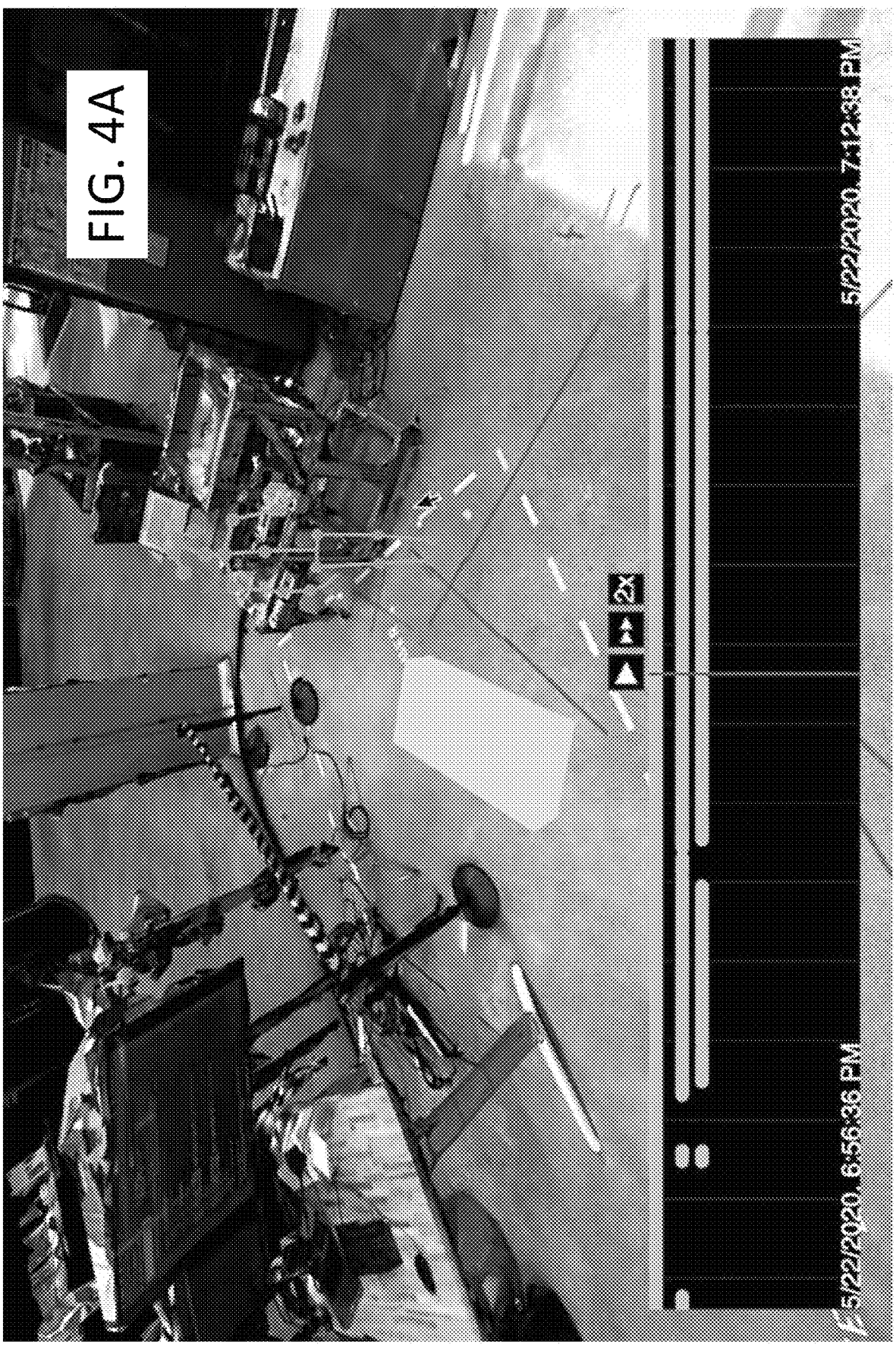
Figure 4D:
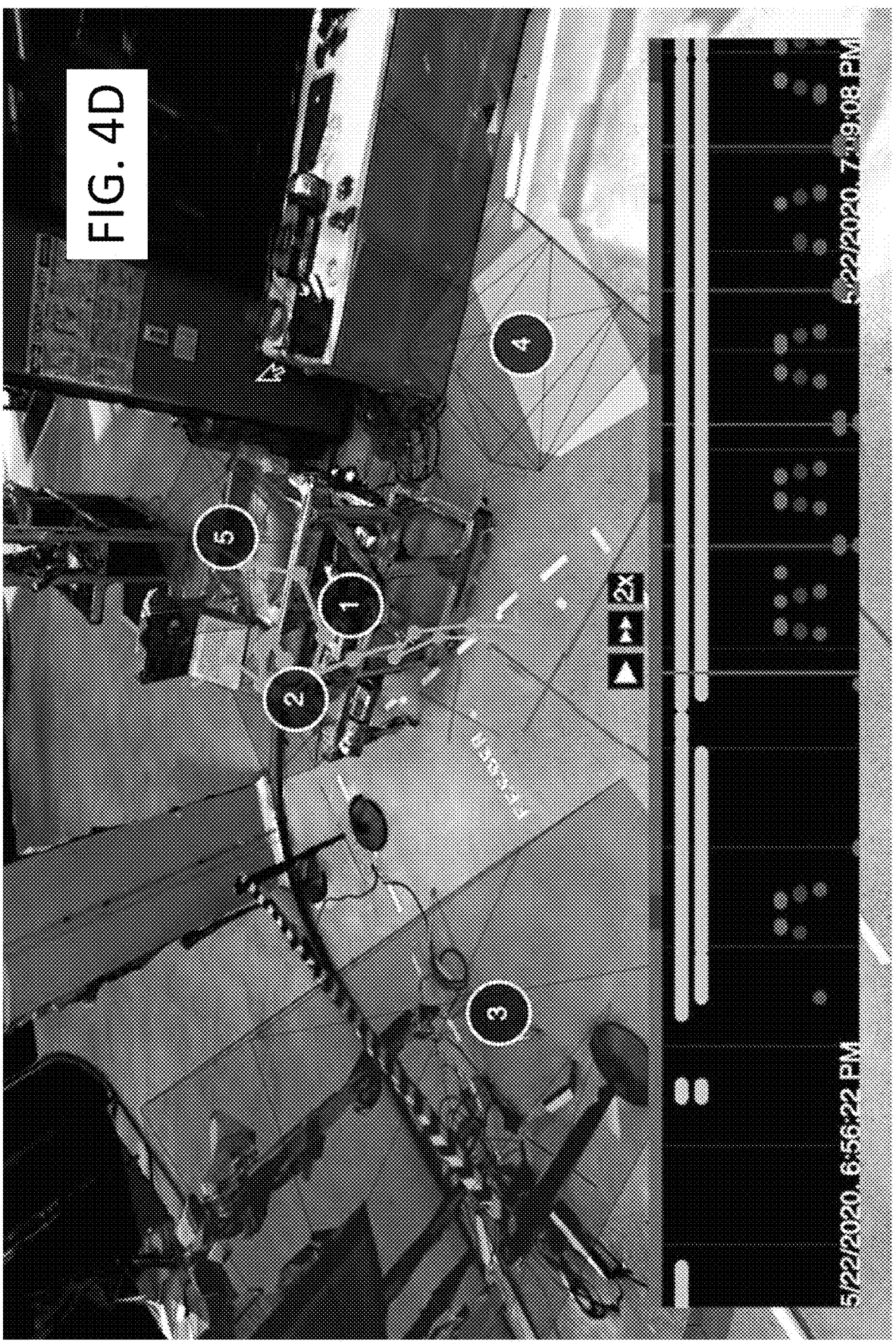
Figure 4E:
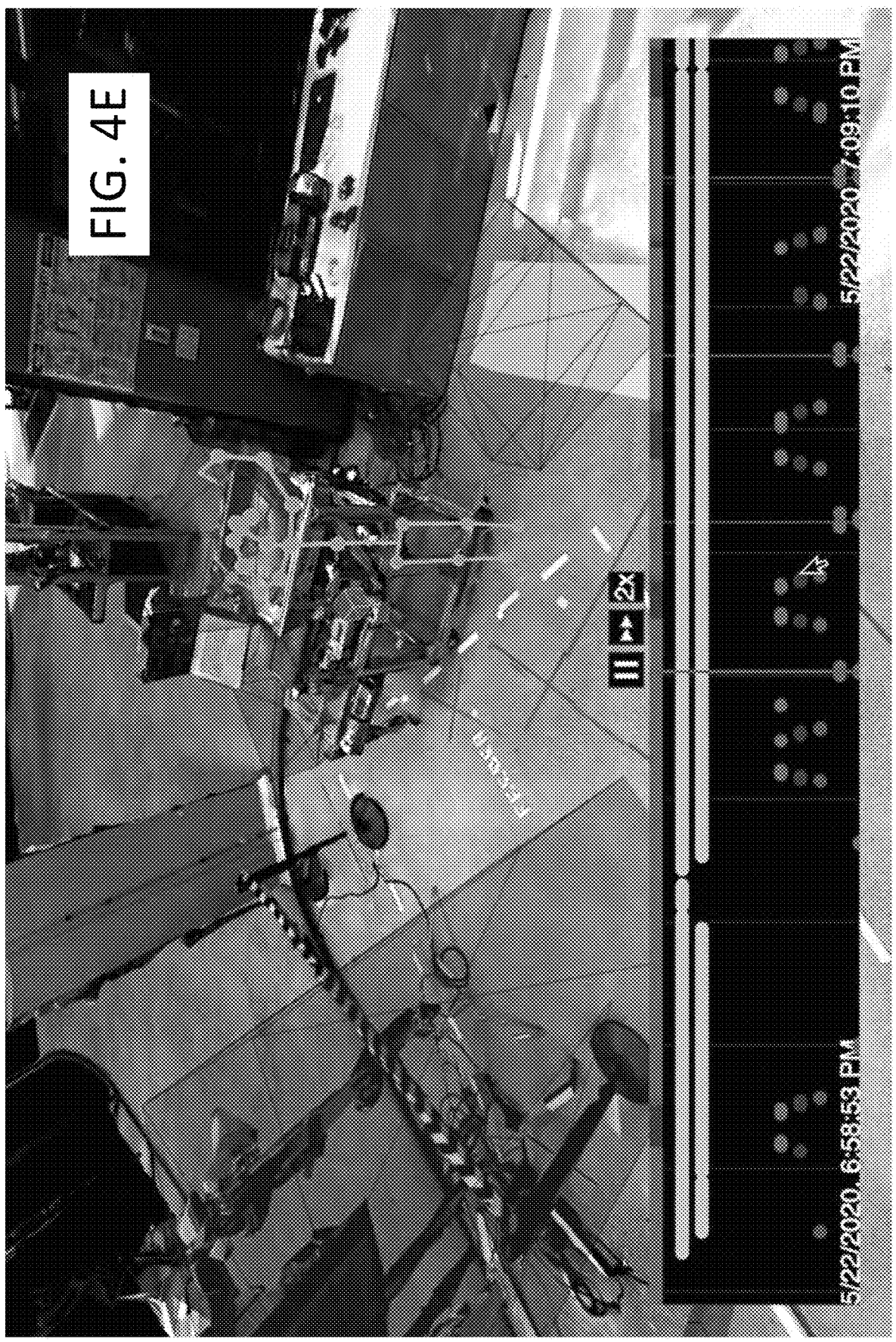
Figure 4F:
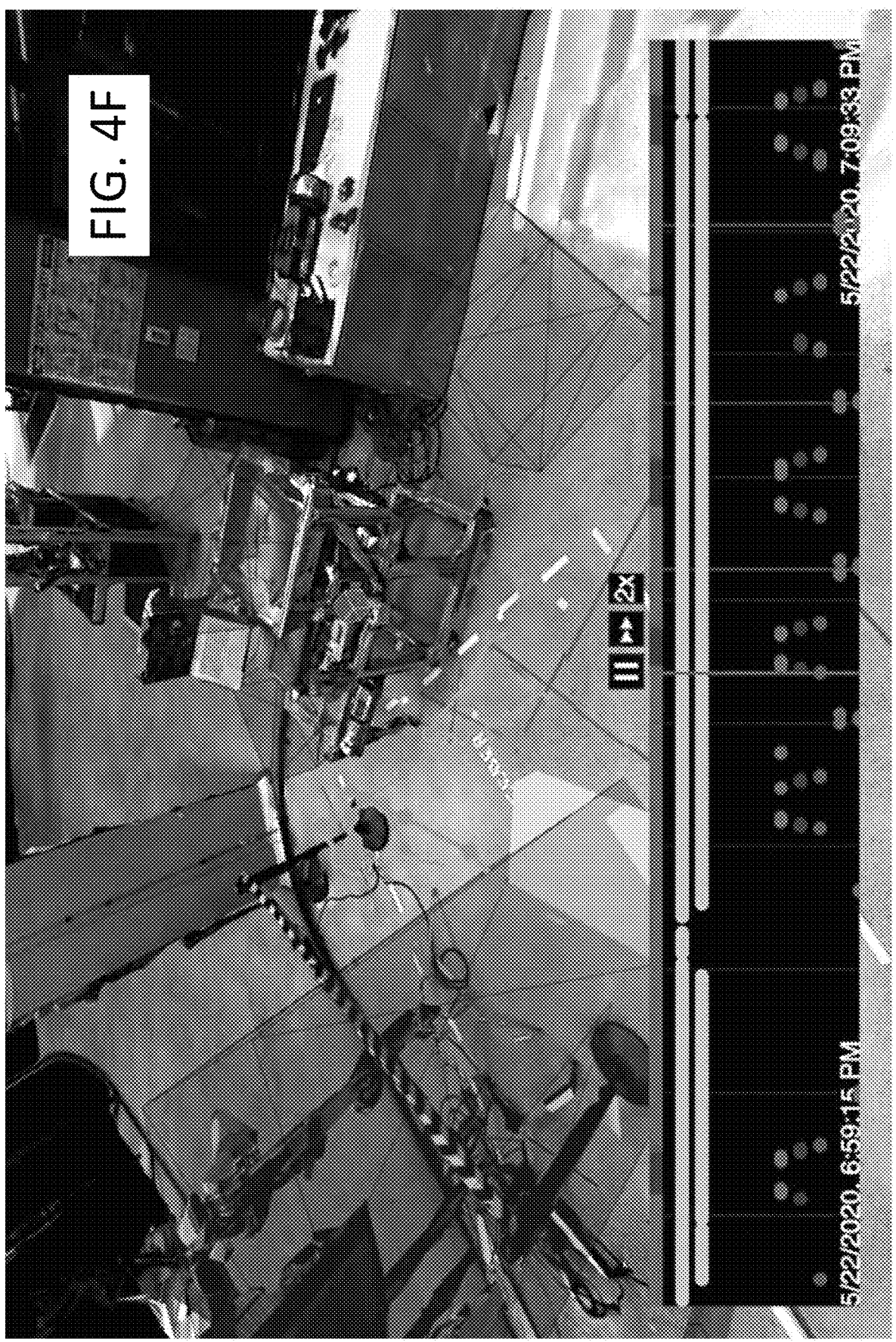
Figure 4G:
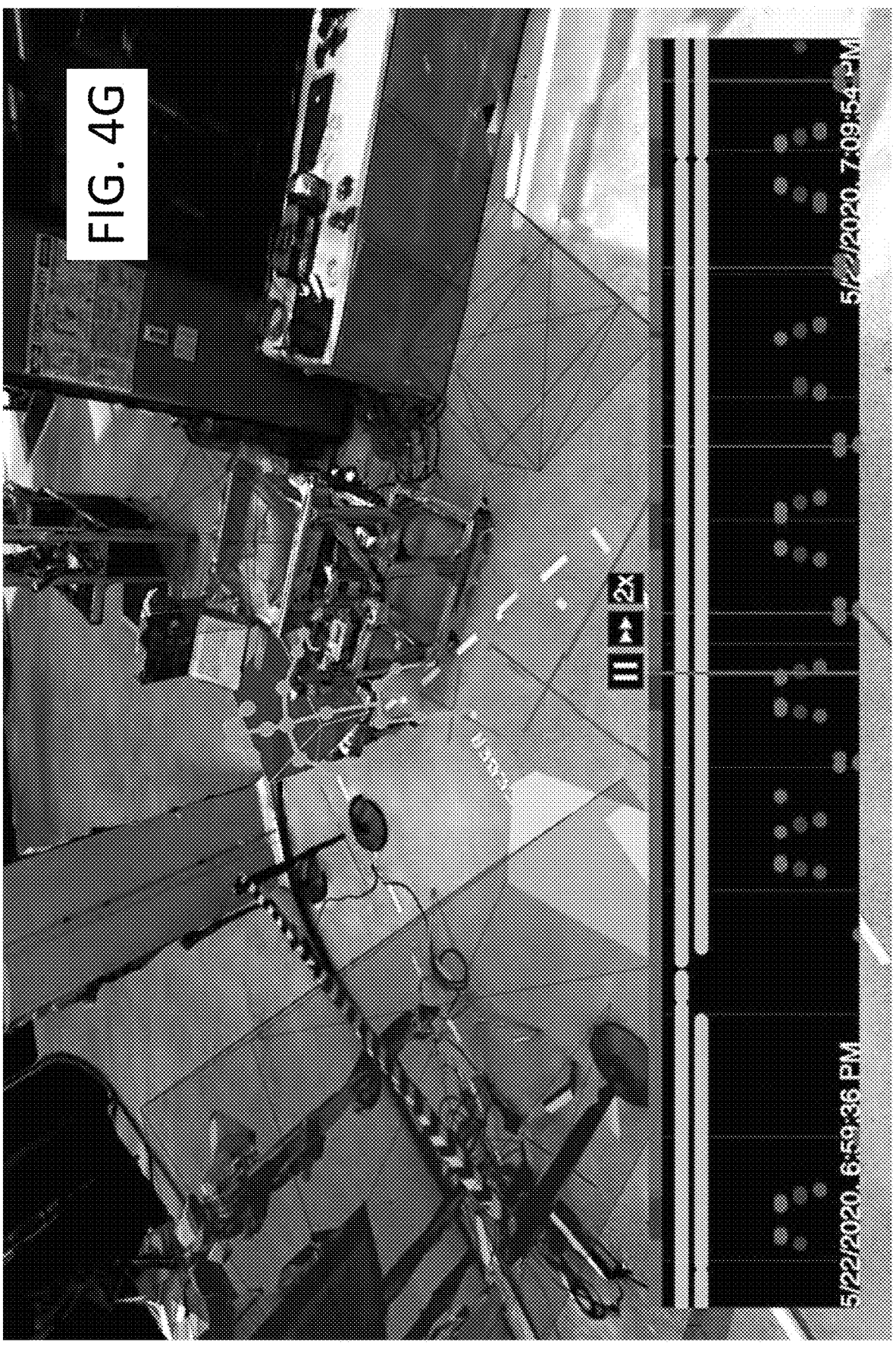
Figure 4H:
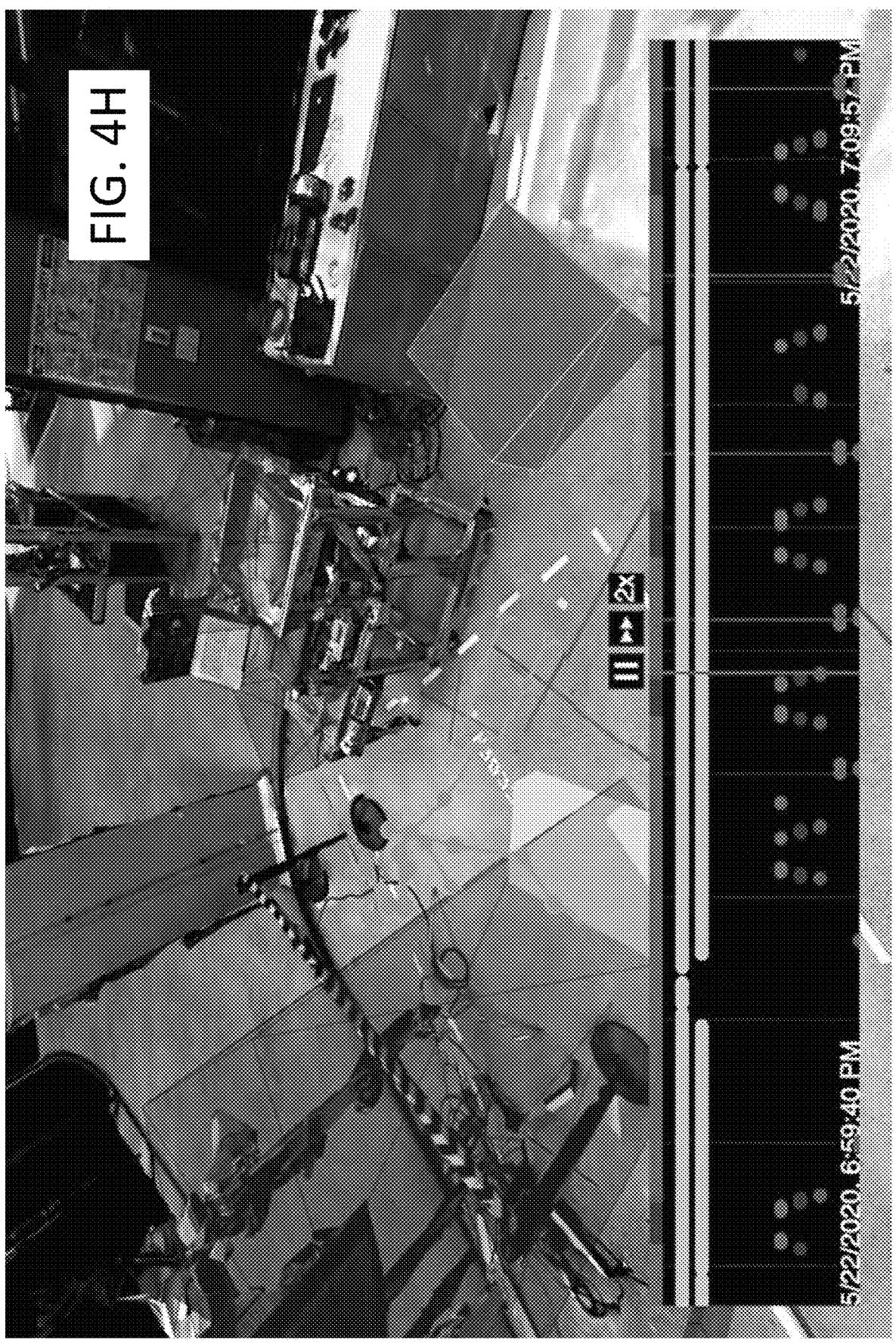
Figure 4I:
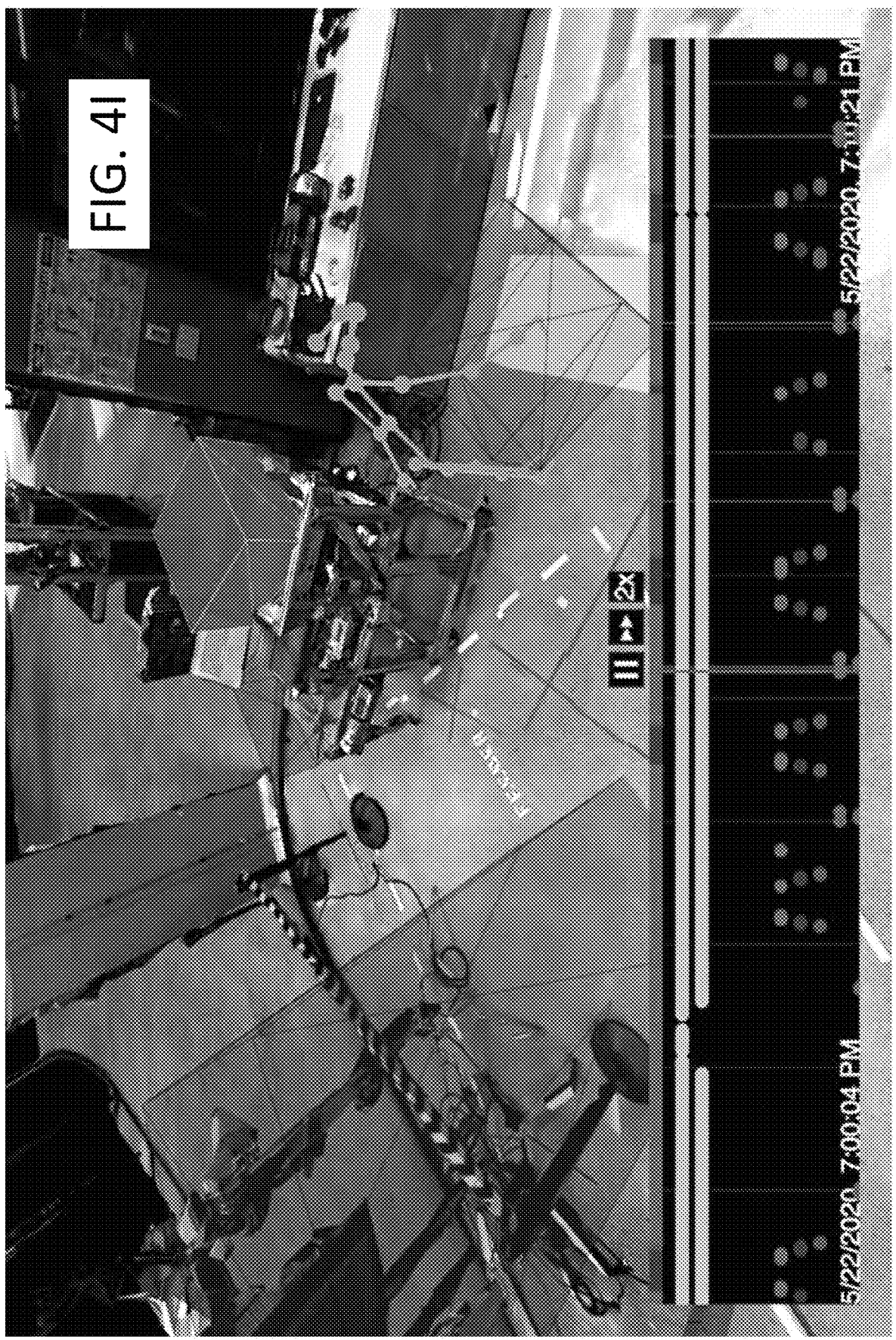
Figure 4K:
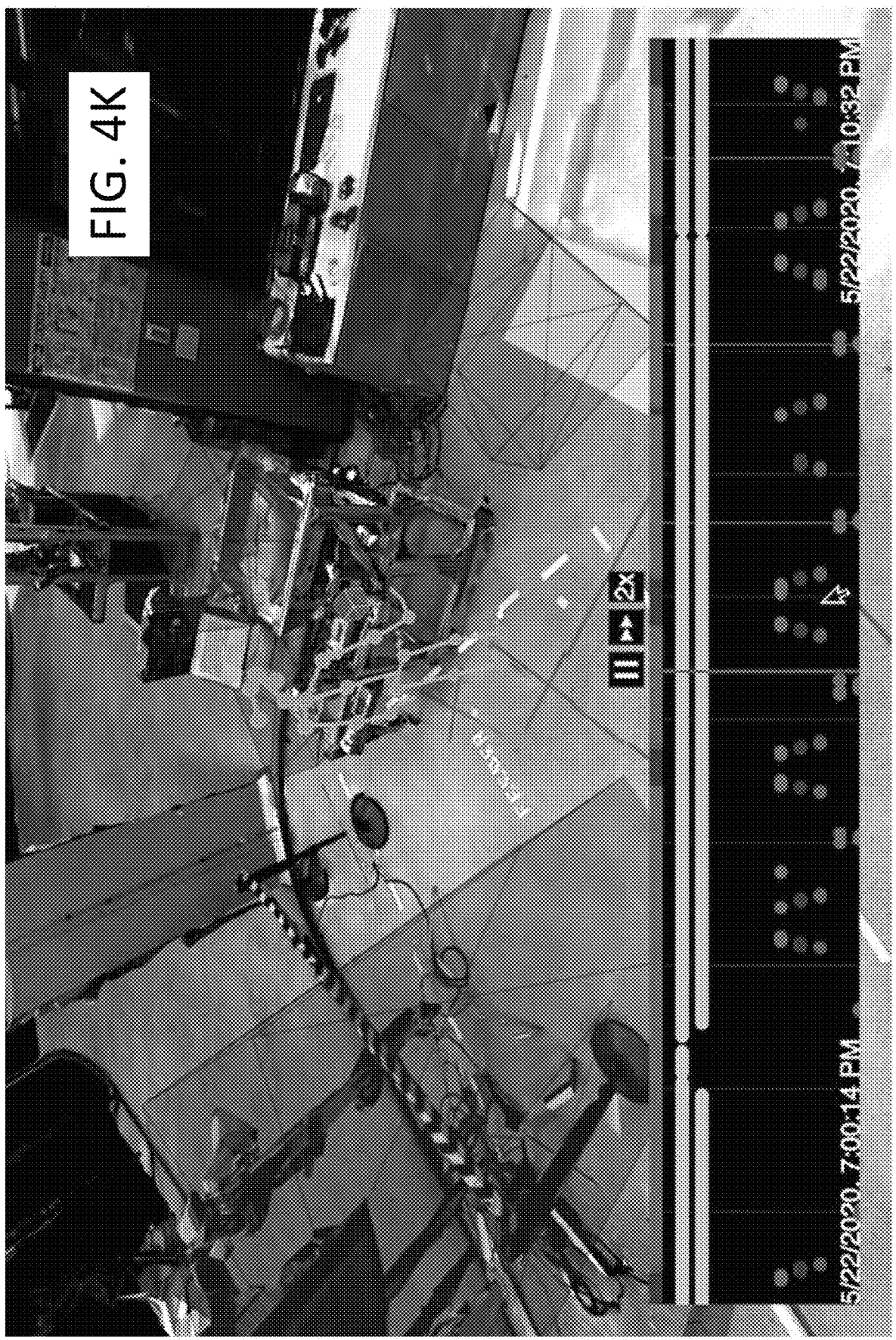
Figure 4L:
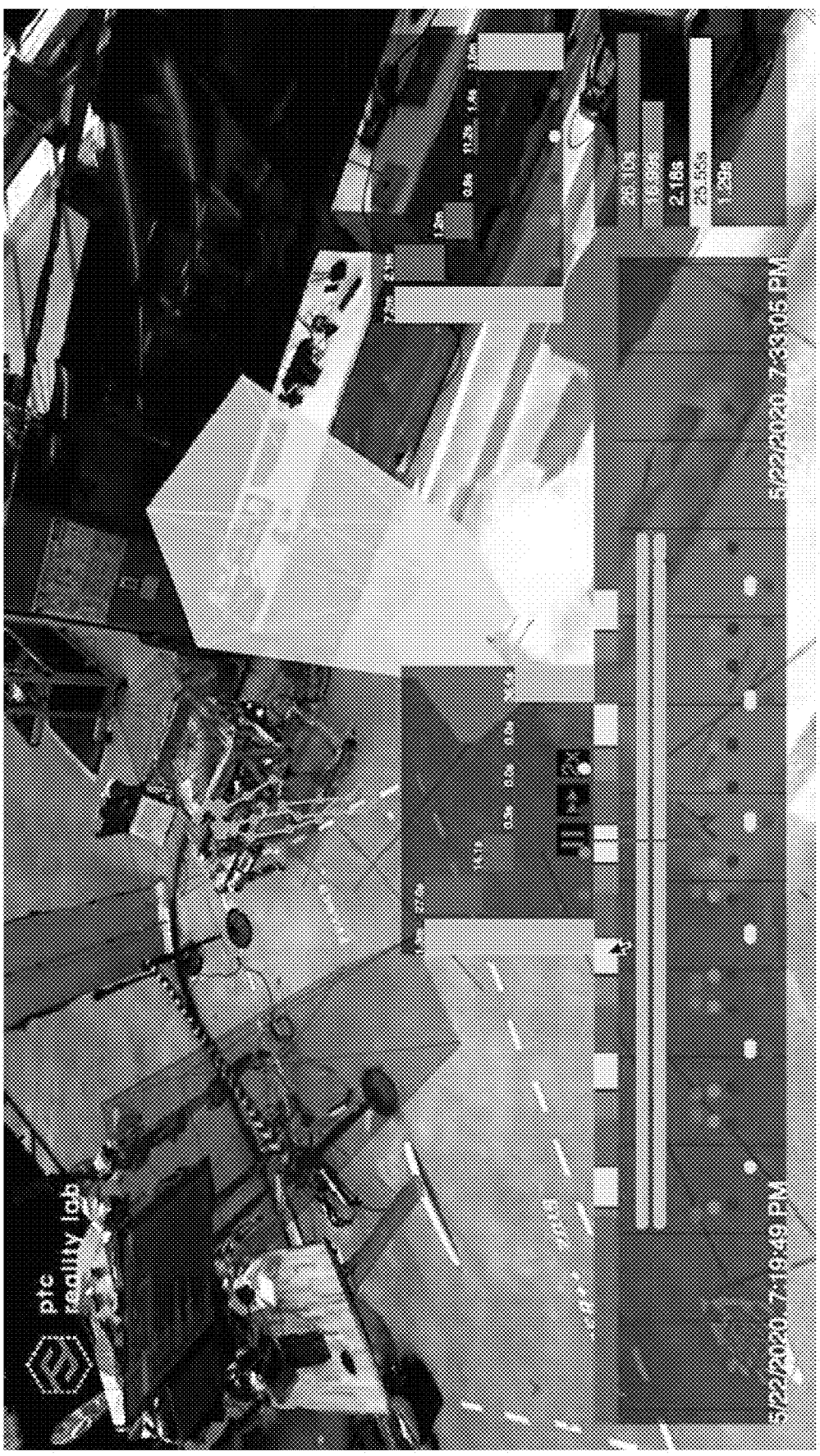
Figure 5:
FIG. 5 illustrates a representation of data extracted from the dynamic 3D model of the laboratory environment as viewed from the right side of the laboratory.

FIGS. 3-5 illustrate a demonstration of a prototype of one embodiment of the system in operation in a laboratory environment.

FIGS. 3A-D illustrate frames of video showing a laboratory environment with respect to which the system is being demonstrated. In FIG. 3A, an AGV is shown maneuvering to a first predetermined position to the right of a machine. In FIG. 3B, a person picks up a bin of material from the platform of the AGV. In FIG. 3C, the person empties the bin into a hopper on the machine. In FIG. 3D, the person returns the empty bin to the platform of the AGV. Although not shown, the AGV then maneuvers to a second predetermined position to the left of a scale which is positioned to the left of the machine under the end of a conveyer belt. The person picks up the empty bin from the AGV, and places it on the scale under the end of the conveyer belt, and the person then presses a button to start the machine. The machine then moves material on the conveyer belt from the hopper into the empty bin sitting on the scale. When the scale reaches a predetermined weight, the person again presses the button to stop the machine. The person then places the hopper full of material back on the AGV, and the AGV maneuvers back to the first predetermined position to start the contrived test process again.

FIGS. 4A-L illustrate views of the user interface showing the dynamic 3D model including the person and the AGV superimposed over the static 3D model of the laboratory as well as the creation and use of virtual spatial interaction sensors. FIG. 4A shows a skeletal representation of the person standing in front of the machine with a rectangular box representing the AGV positioned to the left and behind the person. The skeletal pose of the person is determined by using the Microsoft Azure Kinect Body Tracking SDK. Although FIG. 4A depicts the models at one point in time, as represented on the scrubber bar at the bottom of the user interface, the models can be paused and/or played back under user control. In addition to controlling the time and playback of the models, the user can also modify the pose of the perspective view from which the user interface displays the models.

FIG. 4B shows a user in the process of creating a virtual spatial interaction sensor in the shape of a cube to be positioned above the machine's actuation button in the upper center portion of the figure. The four selectable icons shown displayed in the user interface facilitate the user's creation and configuration of the sensor. In FIG. 4B, the user has manipulated the pose of the perspective view to be pointing at the machine from behind and to the right of the person standing in front of the machine. As noted above, the 3D models enable the user to manipulate the desired perspective from which to view the environment.

FIG. 4C shows a final positioning of the sensor by the user. In the lower portion of the images on the timeline are shown dots with a color corresponding to the sensor, where the dots indicate times on the timeline when a moveable object in the environment, as represented by the dynamic 3D model, has intersected with the sensor as positioned. FIG. 4D shows a total of five separate virtual spatial interaction sensors, each represented by a partially transparent box with an encircled number overlaid within the user interface and relative to dynamic 3D model as well as the static 3D model in the background. Each of the five sensors is also shown on the timeline with color-coordinated dots showing times at which intersections occurred with each sensor.

FIGS. 4E-K illustrate screen captures of the dynamic model overlaid on the static model as played back over the course of once cycle of the person operating the contrived process lasting about 1 minute and 20 seconds. FIG. 4L illustrates the user interface augmented with two waterfall diagrams showing timings associated with triggering of the various sensors as well as a bar chart showing color coded time periods associated with the triggering of sensors.

FIG. 5 illustrates a representation of data extracted from the dynamic 3D model of the laboratory environment as viewed from the right side of the laboratory. The person is represented in a static position on front of the machine at one point in time using a skeletal view. Also shown in this view is a trace of a historical path of a point on the person's head over time. Below the trace of the position of the person's head is a trace of a historical path of a point on the AGV. On the floor are marked the first and second predetermined positions of the AGV as well as an intermediate position through which the AGV passes between the first and the second positions. A trace of a path of a second point on the AGV is also marked just above the floor. A rough shaded depiction of the static 3D model is shown in the background for context.

Figure 6A:
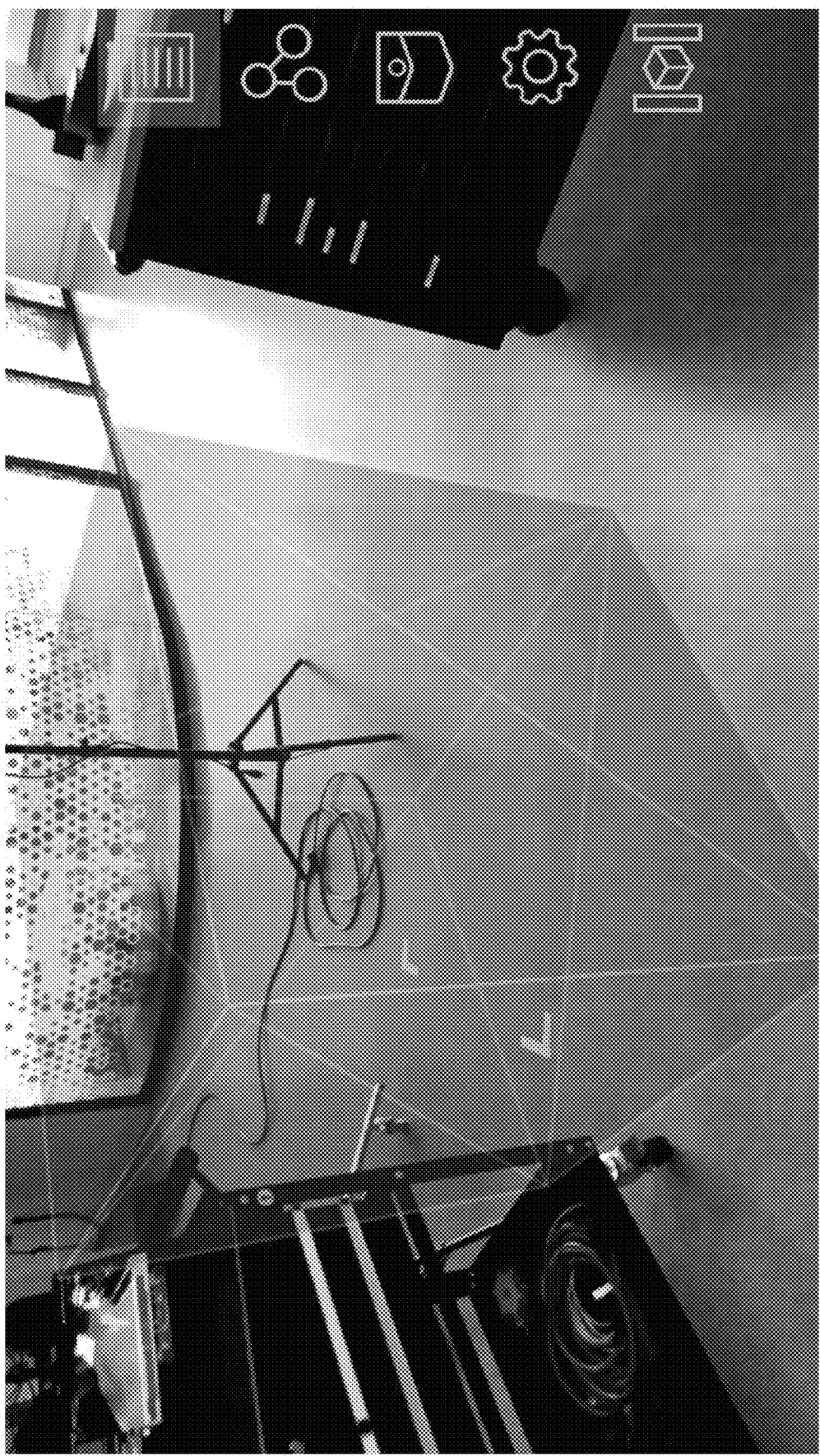
FIGS. 6A-H illustrate screen captures from a mobile device executing an augmented reality application to create and demonstrate use of a virtual spatial interaction sensor on site in an industrial environment.
Figure 6B:
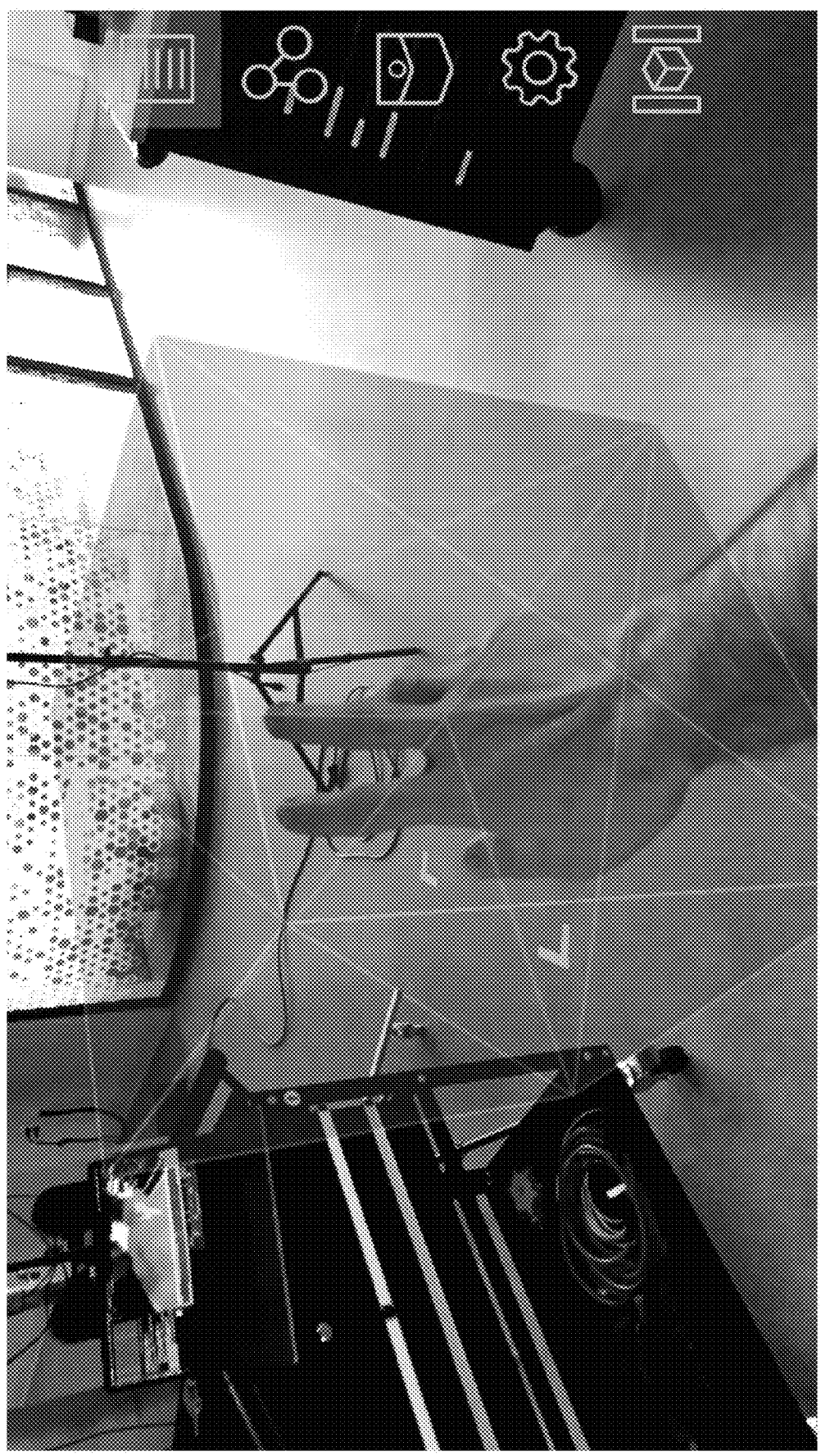
Figure 6C:
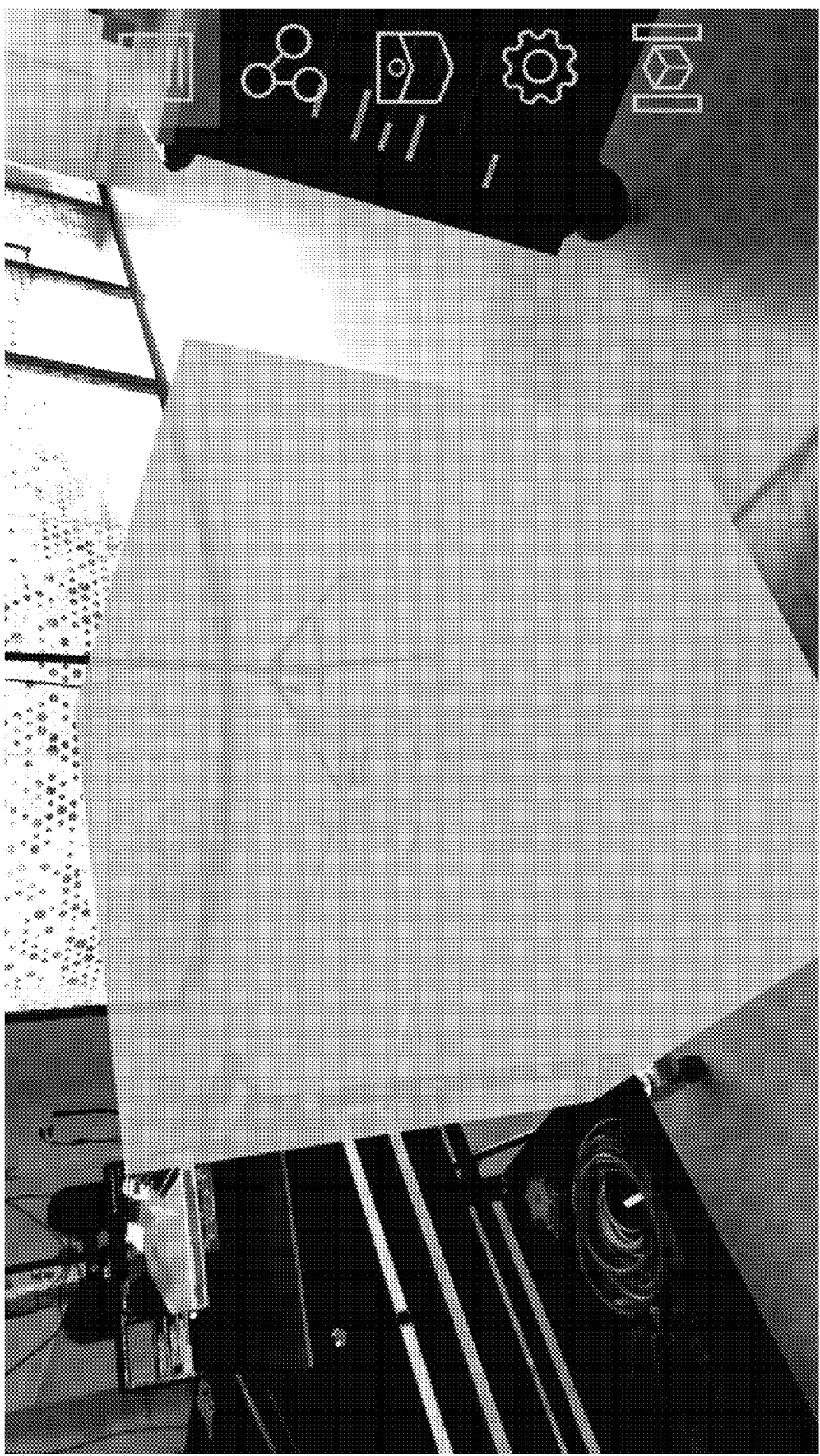

FIGS. 6A-H illustrate screen captures from a mobile device executing an augmented reality application to create and demonstrate use of a virtual spatial interaction sensor on site in an industrial environment. In FIG. 6A, the display of the mobile device shows a cube shaped virtual sensor shown as a semi-transparent overlay over a video feed from the mobile device's camera. In order to create the virtual sensor, the user had previously selected an icon for creating the virtual sensor and then positioned the sensor in virtual space using a finger gesture on the display such as a drag and lift. The virtual sensor is then shown positioned in space between two rolling carts shown in the video feed. The mobile device in turn communicates the specification of the virtual sensor to the server system, which is receiving images from additional stationary cameras trained on this industrial environment. In FIG. 6B, the user reaches a hand out in front of the device's camera to intersect with the virtual sensor. In FIG. 6C, the mobile device has received a notification from the server system indicating that a moving object has intersected with the virtual sensor, and the mobile device in turn highlights the sensor in a different color to indicate the intersection. As will be understood by one skilled in the art, the specific selectable icons and gestures that are supported and which can be used in the augmented reality interface to create the virtual sensor and set its specifications such as size, shape and pose, can vary depending on implementation, and so are not described in detail here.

Figure 6D:
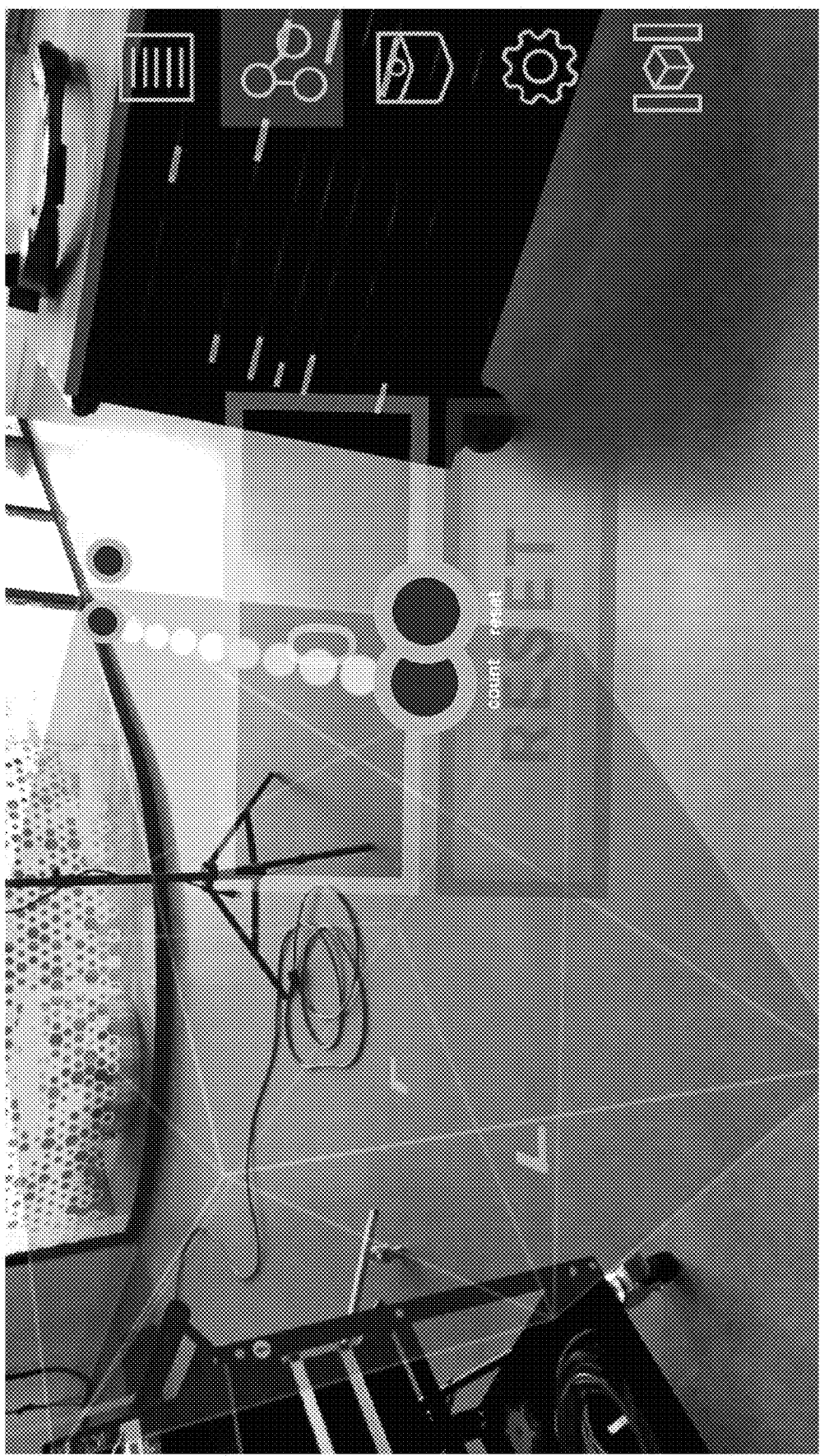
Figure 6E:
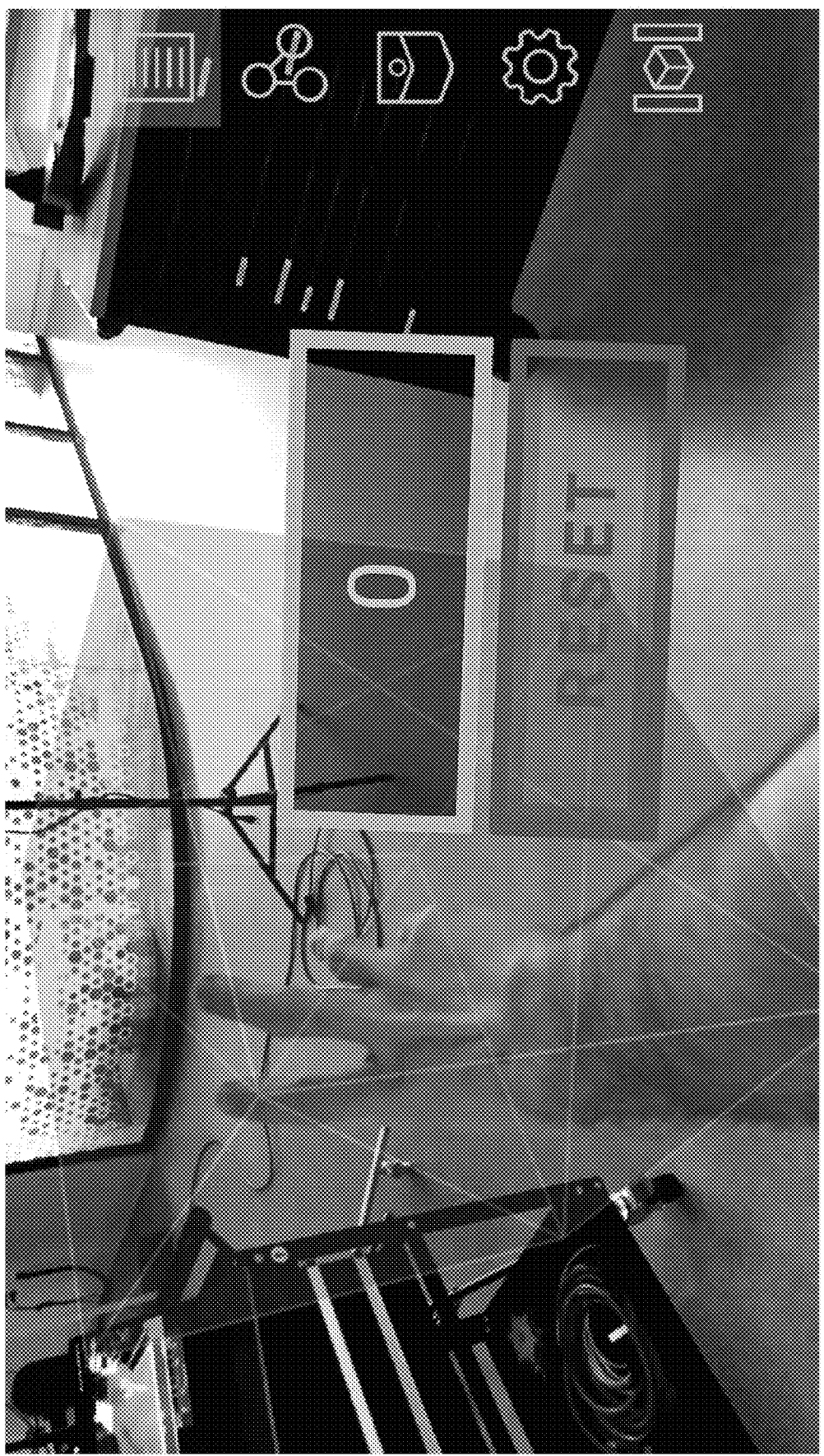
Figure 6F:
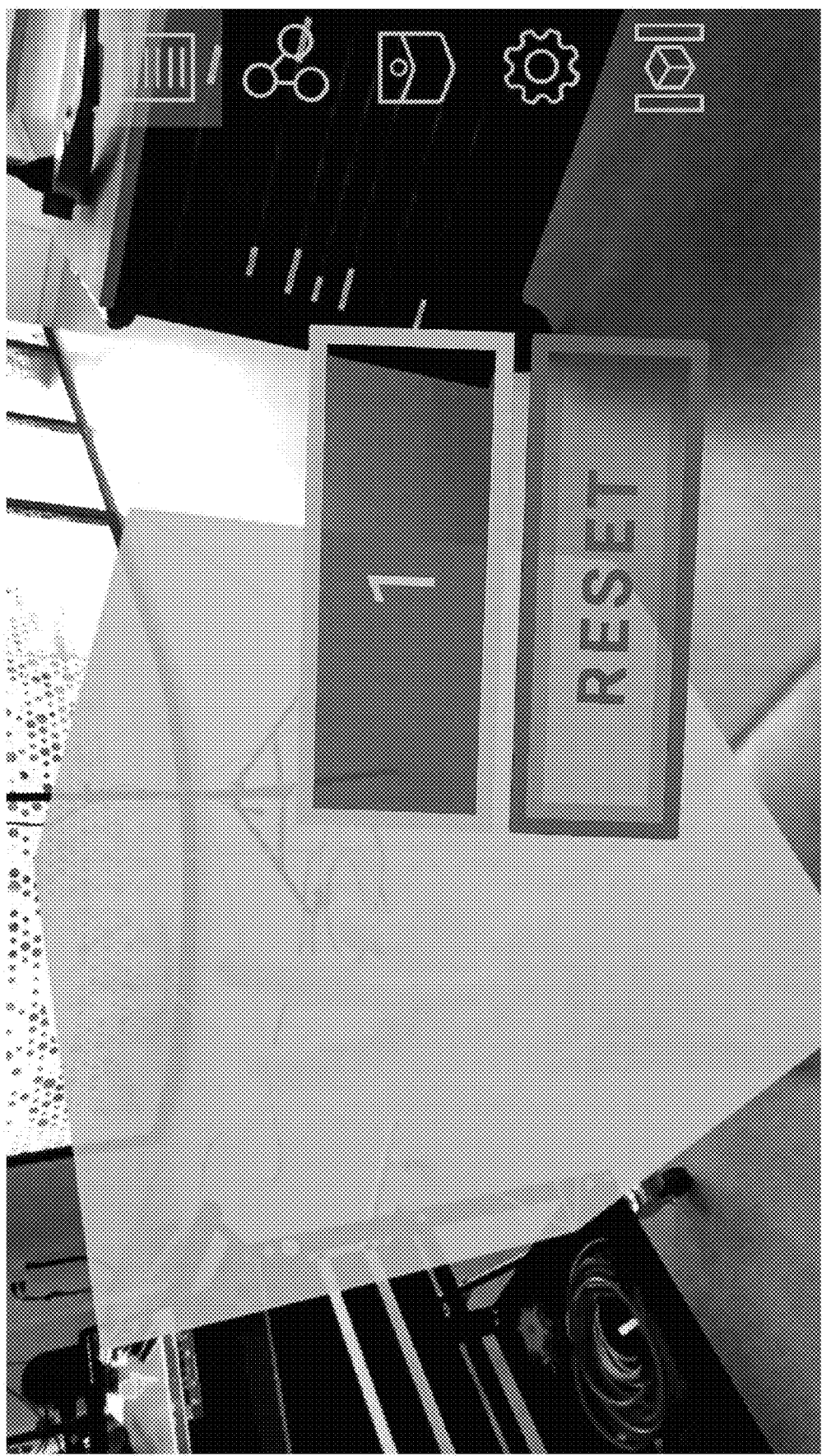
Figure 6G:
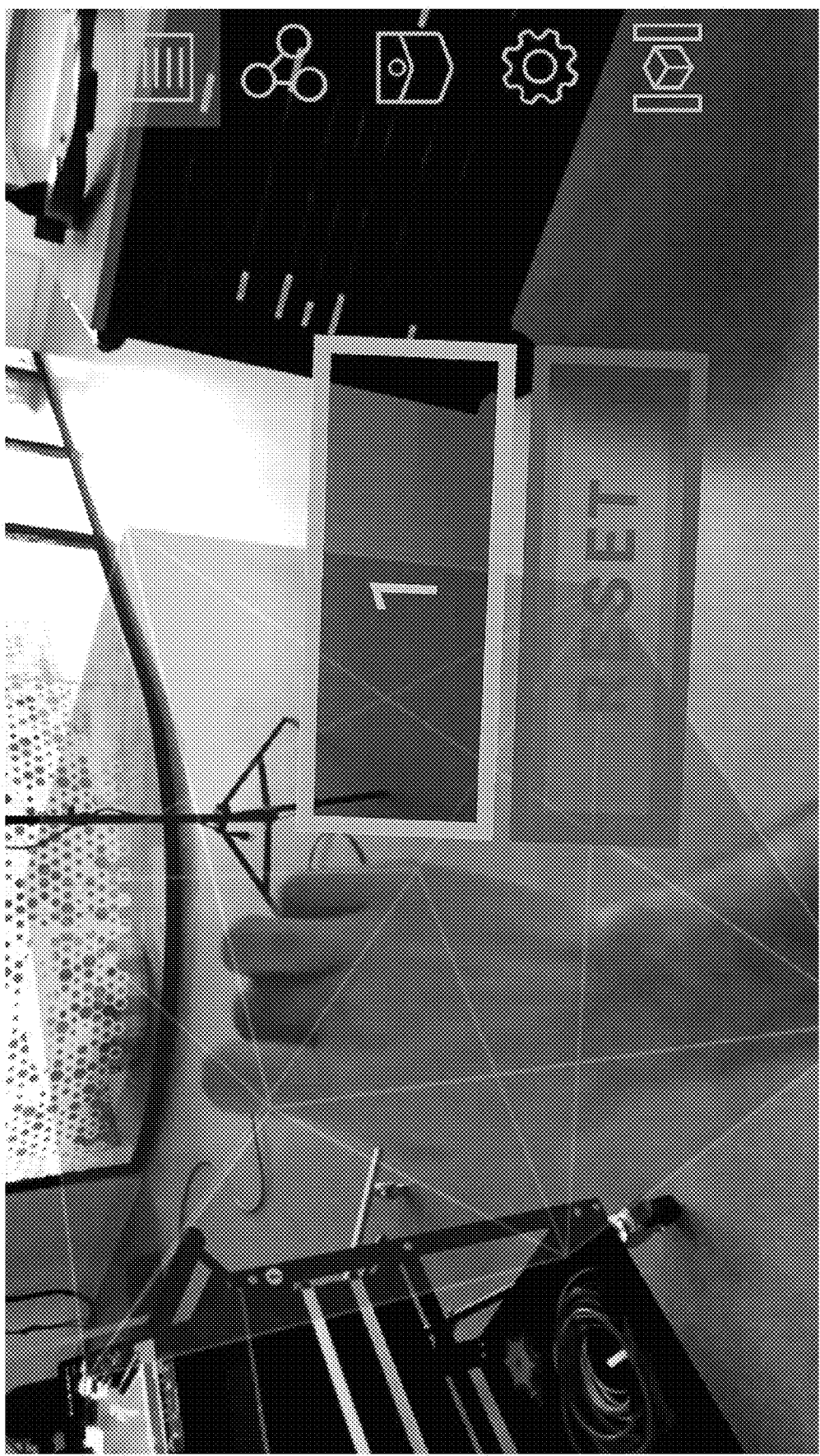
Figure 6H:
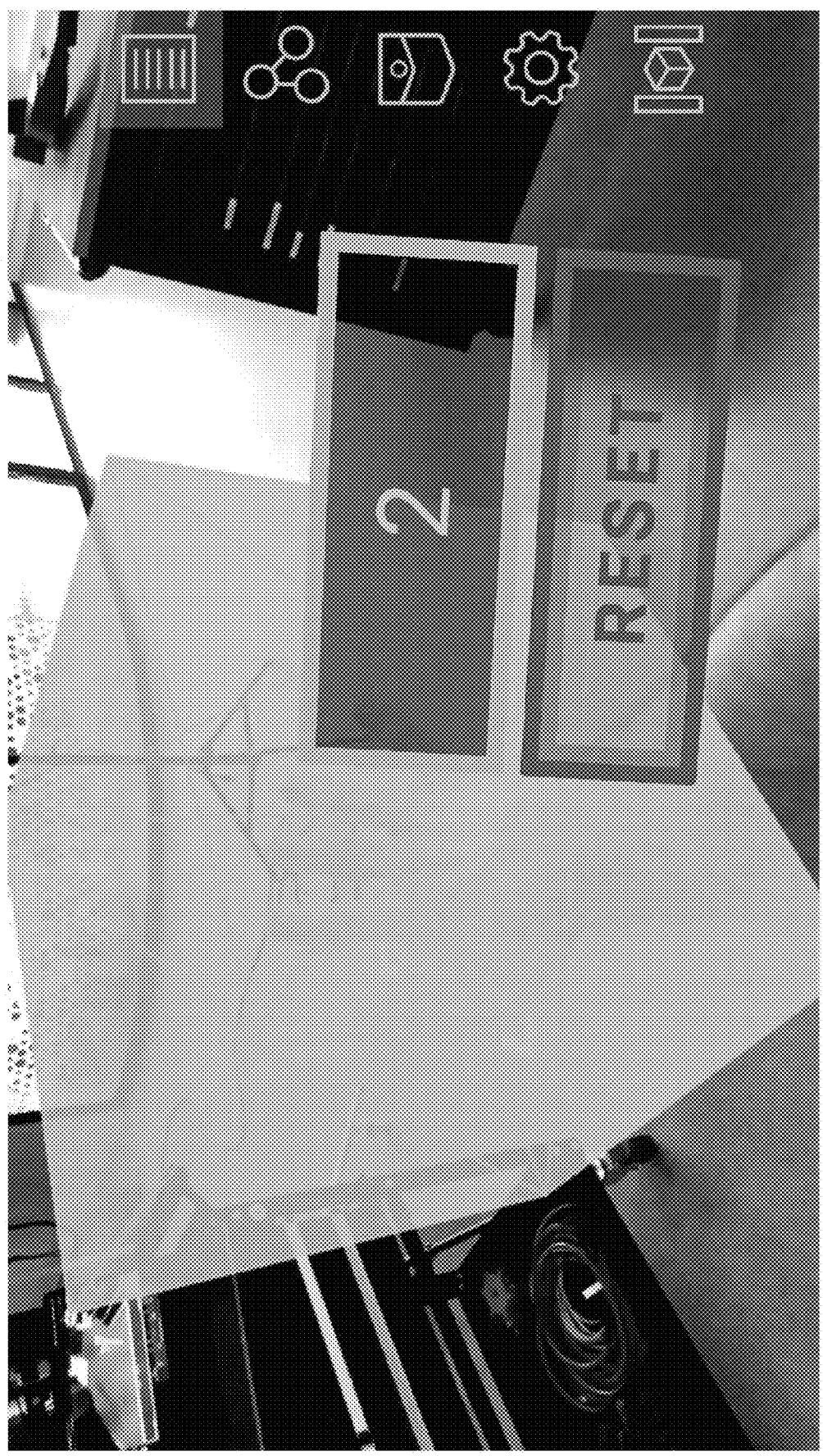

In FIG. 6D, the user has used the mobile device's augmented reality interface in a visual programming environment to create and functionally connect a virtual counter to the virtual sensor. The server system is accordingly configured to maintain the virtual sensor and the connected virtual counter, continuously feeding their states to the mobile device, which in turn displays them in the augmented reality user interface. In FIG. 6E, the user again reaches a hand out in front of the device's camera to intersect with the virtual sensor. In FIG. 6F, the mobile device has received a notification from the server system indicating that a moving object has intersected with the virtual sensor and that the count on the counter has increased by one. The mobile device in turn highlights the sensor in a different color to indicate the intersection and shows the increase on the counter. In FIG. 6G, the user reaches out a hand to again intersect the virtual sensor, and in FIG. 6H the counter and sensor show the additional intersection.

Computer Implementation

Components of the embodiments disclosed herein, which may be referred to as methods, processes, applications, programs, modules, engines, functions or the like, can be implemented by configuring one or more computers or computer systems using special purpose software embodied as instructions on a non-transitory computer readable medium. The one or more computers or computer systems can be or include one or more standalone, client and/or server computers, which can be optionally networked through wired and/or wireless networks as a networked computer system.

The special purpose software can include one or more instances thereof, each of which can include, for example, one or more of client software, server software, desktop application software, app software, database software, operating system software, and driver software. Client software can be configured to operate a system as a client that sends requests for and receives information from one or more servers and/or databases. Server software can be configured to operate a system as one or more servers that receive requests for and send information to one or more clients. Desktop application software and/or app software can operate a desktop application or app on desktop and/or portable computers. Database software can be configured to operate one or more databases on a system to store data and/or information and respond to requests by client software to retrieve, store, and/or update data. Operating system software and driver software can be configured to provide an operating system as a platform and/or drivers as interfaces to hardware or processes for use by other software of a computer or computer system. By way of example, any data created, used or operated upon by the embodiments disclosed herein can be stored in, accessed from, and/or modified in a database operating on a computer system.

Figure 7:
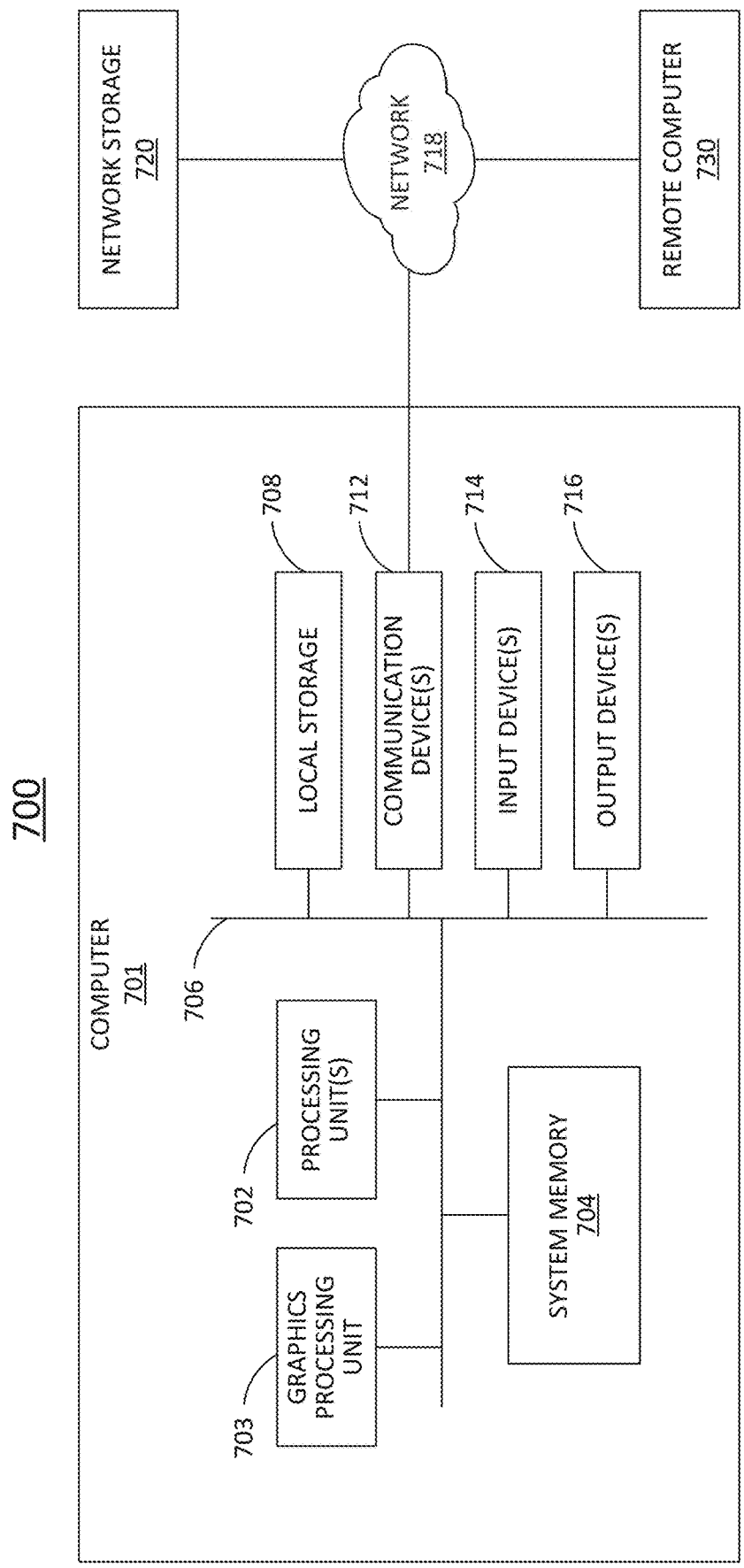
FIG. 7 illustrates a general computer architecture that can be appropriately configured to implement components disclosed in accordance with various embodiments.

FIG. 7 illustrates a general computer architecture 700 that can be appropriately configured to implement components disclosed in accordance with various embodiments. The computing architecture 700 can include various common computing elements, such as a computer 701, a network 718, and one or more remote computers 730. The embodiments disclosed herein, however, are not limited to implementation by the general computing architecture 700.

Referring to FIG. 7, the computer 701 can be any of a variety of general purpose computers such as, for example, a server, a desktop computer, a laptop computer, a tablet computer or a mobile computing device. The computer 701 can include a processing unit 702, a system memory 704 and a system bus 706.

The processing unit 702 can be or include one or more of any of various commercially available computer processors, which can each include one or more processing cores that can operate independently of each other. Additional co-processing units, such as a graphics processing unit 703, also can be present in the computer.

The system memory 704 can include volatile devices, such as dynamic random access memory (DRAM) or other random access memory devices. The system memory 704 can also or alternatively include non-volatile devices, such as a read-only memory or flash memory.

The computer 701 can include local non-volatile secondary storage 708 such as a disk drive, solid state disk, or removable memory card. The local storage 708 can include one or more removable and/or non-removable storage units. The local storage 708 can be used to store an operating system that initiates and manages various applications that execute on the computer. The local storage 708 can also be used to store special purpose software configured to implement the components of the embodiments disclosed herein and that can be executed as one or more applications under the operating system.

The computer 701 can also include communication device(s) 712 through which the computer communicates with other devices, such as one or more remote computers 730, over wired and/or wireless computer networks 718. Communications device(s) 712 can include, for example, a network interface for communicating data over a wired computer network. The communication device(s) 712 can include, for example, one or more radio transmitters for communications over Wi-Fi, Bluetooth, and/or mobile telephone networks.

The computer 701 can also access network storage 720 through the computer network 718. The network storage can include, for example, a network attached storage device located on a local network, or cloud-based storage hosted at one or more remote data centers. The operating system and/or special purpose software can alternatively be stored in the network storage 720.

The computer 701 can have various input device(s) 714 such as a keyboard, mouse, touchscreen, camera, microphone, accelerometer, thermometer, magnetometer, or any other sensor. Output device(s) 716 such as a display, speakers, printer, or eccentric rotating mass vibration motor can also be included.

The various storage 708, communication device(s) 712, output devices 716 and input devices 714 can be integrated within a housing of the computer, or can be connected through various input/output interface devices on the computer, in which case the reference numbers 708, 712, 714 and 716 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs).

CONCLUSION

Although the subject matter has been described in terms of certain embodiments, other embodiments that may or may not provide various features and aspects set forth herein shall be understood to be contemplated by this disclosure. The specific embodiments described above are disclosed as examples only, and the scope of the patented subject matter is defined by the claims that follow.

In the claims, the terms "based upon" and "based on" shall include situations in which a factor is taken into account directly and/or indirectly, and possibly in conjunction with other factors, in producing a result or effect. In the claims, a portion shall include greater than none and up to the whole of a thing.

The invention claimed is:

1. A method performed by one or more computers, each computer having at least one processor and a memory, the method comprising:
    receiving image data comprising multiple images of a physical industrial environment captured over one or more periods of time by one or more cameras;
    processing the image data to create a static 3D model representing stationary structure in the environment;
    processing the image data to create a dynamic 3D model representing one or more moveable objects in the environment over time;
    providing a user interface through which a user can view and control a visual perspective of a replay of the dynamic 3D model over time visually superimposed on the static 3D model;
    receiving from the user through the user interface a specification of one or more virtual spatial interaction sensors, wherein each virtual spatial interaction sensor is defined by a point or volume of space within the environment;
    displaying to the user in the user interface a visual depiction of each point or volume of space within the environment defining the one or more virtual spatial interaction sensors superimposed on a visual depiction of the static 3D model in a visual perspective; and
    analyzing a portion of the dynamic 3D model to identify intersections between the one or more moveable objects and the one or more virtual spatial interaction sensors over time.

2. The method of claim 1, wherein the static 3D model comprises a colored point cloud or a textured polygon mesh.

3. The method of claim 1, wherein each moveable object is represented in the dynamic 3D model by one or more of moveable points, lines, polygons, volumes, point clouds and polygon meshes in space.

4. The method of claim 1, wherein the visual perspective of the replay of the dynamic 3D model over time visually superimposed on the static 3D model comprises one or more of moveable points, lines, polygons, volumes, point clouds and polygon meshes representing the moveable objects superimposed over a point cloud or polygon mesh representation of the stationary structure.

5. The method of claim 1, wherein at least one virtual spatial interaction sensor is defined by a shape and a pose.

6. The method of claim 5, wherein the shape is a geometric shape, a polygon mesh or a point cloud.

7. The method of claim 5, wherein the pose is specified relative to an aspect of the environment.

8. The method of claim 7, wherein the aspect of the environment is a stationary coordinate system fixed relative to the environment.

9. The method of claim 7, wherein the aspect of the environment is one of the one or more moveable objects.

10. The method of claim 1, further comprising:
storing identifications of the intersections in a log file.

11. The method of claim 1, further comprising:
visually representing the identified intersections on a time-based graph in the user interface.

12. The method of claim 1, further comprising:
performing an analysis of the identified intersections to identify operational inefficiencies in the industrial environment.

13. The method of claim 1, further comprising:
triggering an action in the industrial environment based on an identified intersection.

14. The method of claim 13, wherein the action comprises starting a process or stopping a process.

15. The method of claim 1, wherein the one or more moveable objects comprise one or more of: a human, an industrial machine, a robot, a workpiece, a tool, and a vehicle.

16. The method of claim 1, wherein each of the one or more cameras is a depth camera configured to capture color data registered with depth data.

17. The method of claim 1, wherein one of the one or more cameras comprises a 3D LIDAR sensor.

18. The method of claim 1, wherein the one or more cameras number at least two, and wherein the user can freely navigate a six dimensional pose of the visual perspective about the static and dynamic 3D models through the user interface.

19. A system comprising the one or more computers of the method of claim 1, wherein the one or more computers perform the method of claim 1.

20. One or more non-transitory computer-readable media encoded with computer code that is executed by the one or more computers of the method of claim 1 to cause the one or more computers to perform the method of claim 1.

* * * * *